US011118645B2

(12) United States Patent
Gregg et al.

(10) Patent No.: US 11,118,645 B2
(45) Date of Patent: Sep. 14, 2021

(54) AXLE SPRING SEAT ATTACHMENT ASSEMBLY

(71) Applicant: Hendrickson USA, L.L.C., Schaumburg, IL (US)

(72) Inventors: Dane Gregg, Uniontown, OH (US); Michael D. Oyster, Stow, OH (US); Phillippi R. Pierce, Canton, OH (US)

(73) Assignee: Hendrickson USA, L.L.C., Schaumburg, IL (US)

(*) Notice: Subject to any disclaimer, the term of this patent is extended or adjusted under 35 U.S.C. 154(b) by 179 days.

(21) Appl. No.: 16/554,801

(22) Filed: Aug. 29, 2019

(65) Prior Publication Data
US 2020/0072310 A1    Mar. 5, 2020

Related U.S. Application Data

(60) Provisional application No. 62/724,675, filed on Aug. 30, 2018.

(51) Int. Cl.
| | | |
|---|---|---|
| *F16F 1/26* | (2006.01) | |
| *F16F 1/18* | (2006.01) | |
| *B60G 11/12* | (2006.01) | |

(52) U.S. Cl.
CPC .............. *F16F 1/26* (2013.01); *B60G 11/12* (2013.01); *F16F 1/182* (2013.01)

(58) Field of Classification Search
CPC .. F16F 1/26; F16F 1/182; B60G 11/12; B60G 11/113; B60G 2204/121; B60G 2204/4306

See application file for complete search history.

(56) References Cited

U.S. PATENT DOCUMENTS

| | | | |
|---|---|---|---|
| 1,906,290 | A | 5/1933 | Urschel |
| 2,434,304 | A | 1/1948 | Wilson |
| 2,929,617 | A | 3/1960 | Lewis et al. |
| 3,773,347 | A | 11/1973 | Traylor |
| 4,615,539 | A | 10/1986 | Pierce |
| 5,112,078 | A | 5/1992 | Galazin et al. |
| 5,116,075 | A | 5/1992 | Pierce |
| 5,366,237 | A | 11/1994 | Dilling et al. |
| 5,971,654 | A | 10/1999 | Sweeney, Jr. |
| 6,241,266 | B1 | 6/2001 | Smith et al. |
| 6,508,482 | B2 | 1/2003 | Pierce et al. |
| 7,708,124 | B1 | 5/2010 | Rackers et al. |
| 7,731,211 | B2 | 6/2010 | Ramsey |
| 8,047,558 | B2 | 11/2011 | Ramsey |
| 8,226,099 | B2 | 7/2012 | Koschinat |
| 8,419,029 | B2 | 4/2013 | Muckelrath et al. |

(Continued)

FOREIGN PATENT DOCUMENTS

| | | |
|---|---|---|
| EP | 0625440 B1 | 11/1994 |
| EP | 1334848 A1 | 8/2003 |

(Continued)

*Primary Examiner* — Vishal R Sahni
(74) *Attorney, Agent, or Firm* — Dureska & Moore, LLC; David P. Dureska; Benjamin J. Chojnacki

(57) ABSTRACT

A spring seat attachment assembly for use with an axle/suspension system having at least one leaf spring and an axle, said attachment assembly including a band and a spring seat. The band may include a locator structure and is fixed to the axle and extends around a portion of the axle between 180 degrees and 360 degrees. The spring seat receives the leaf spring and is fixed to the band.

20 Claims, 17 Drawing Sheets

(56) References Cited

U.S. PATENT DOCUMENTS

| | | | |
|---|---|---|---|
| 8,454,040 B2 | 6/2013 | Westnedge et al. | |
| 8,490,989 B2 | 7/2013 | Piehl et al. | |
| 8,528,923 B2 * | 9/2013 | Wakefield | F16D 65/28 |
| | | | 280/124.116 |
| 9,079,467 B2 | 7/2015 | Westnedge et al. | |
| 9,193,236 B2 | 11/2015 | Westnedge et al. | |
| 9,261,227 B2 | 2/2016 | Pierce et al. | |
| 9,327,571 B2 * | 5/2016 | Pierce | B60G 11/113 |
| 2005/0269795 A1 * | 12/2005 | McKenzie | B60B 35/04 |
| | | | 280/124.11 |
| 2006/0249923 A1 | 11/2006 | Ramsey | |
| 2012/0080573 A1 | 4/2012 | Fulton et al. | |
| 2015/0014512 A1 | 1/2015 | Pierce et al. | |
| 2019/0315176 A1 * | 10/2019 | Peck | B60G 11/08 |

FOREIGN PATENT DOCUMENTS

| | | |
|---|---|---|
| JP | H11291731 A | 10/1999 |
| JP | 2014118002 A | 6/2014 |
| KR | 1020080011409 A | 2/2008 |

* cited by examiner

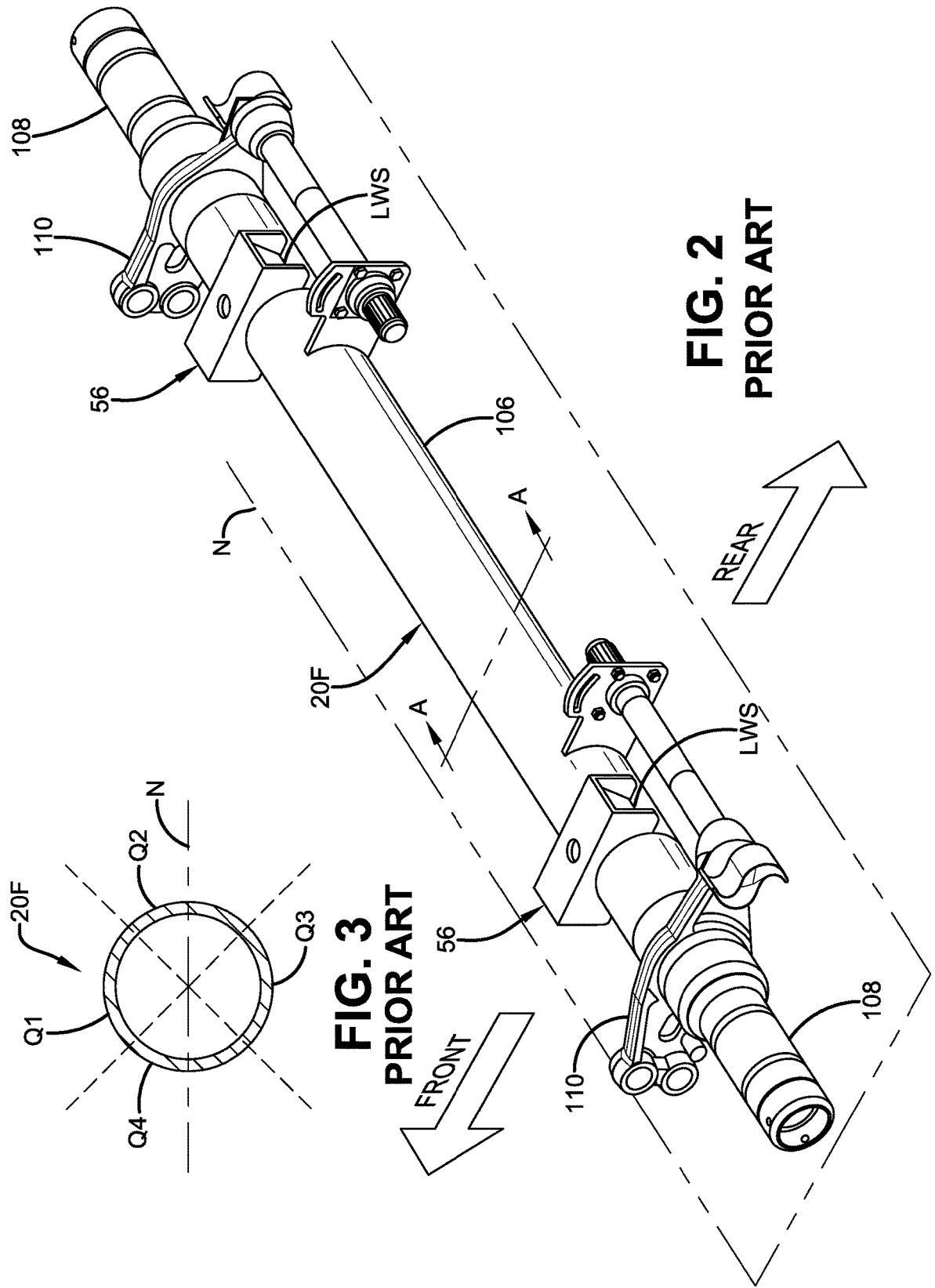

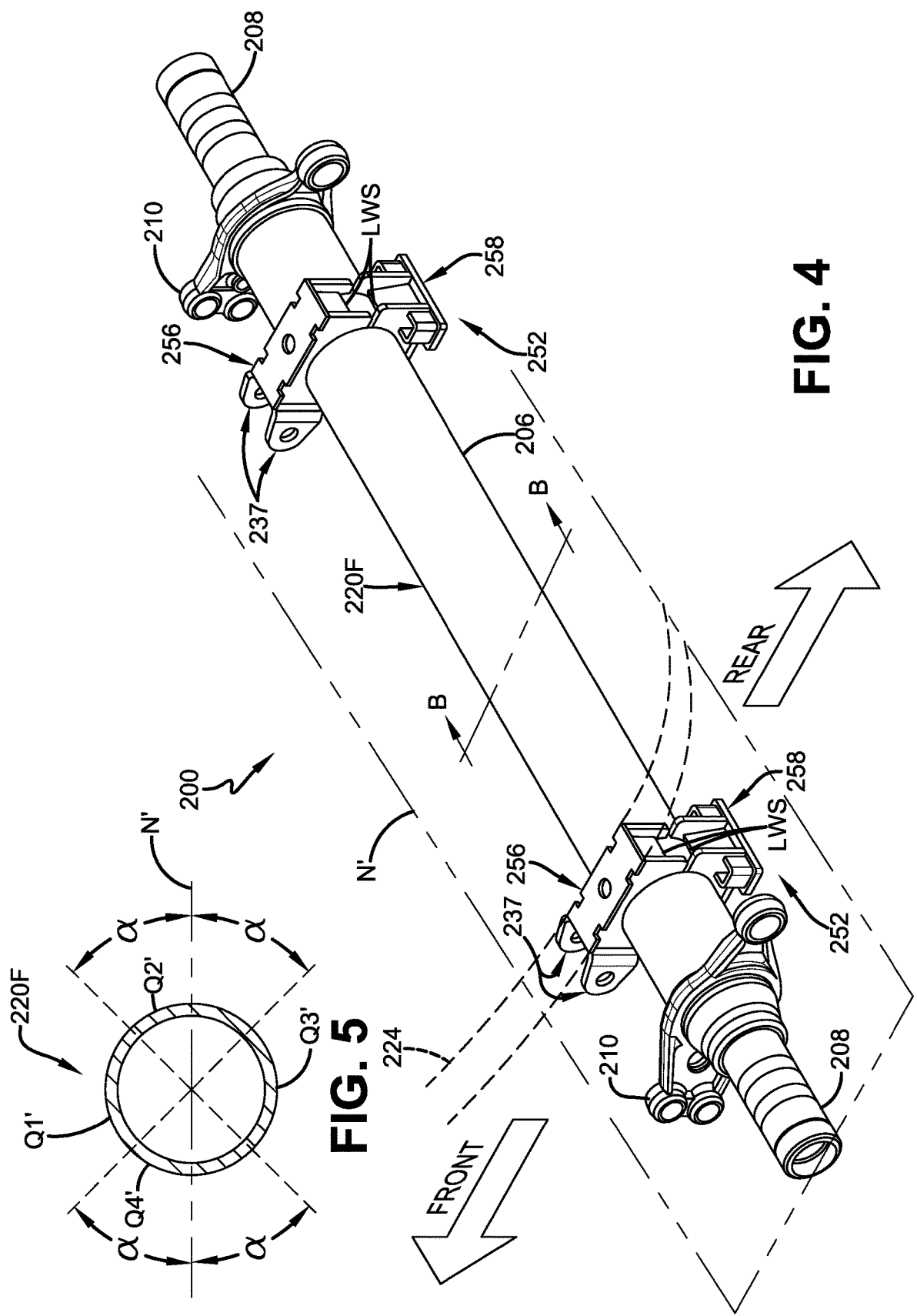

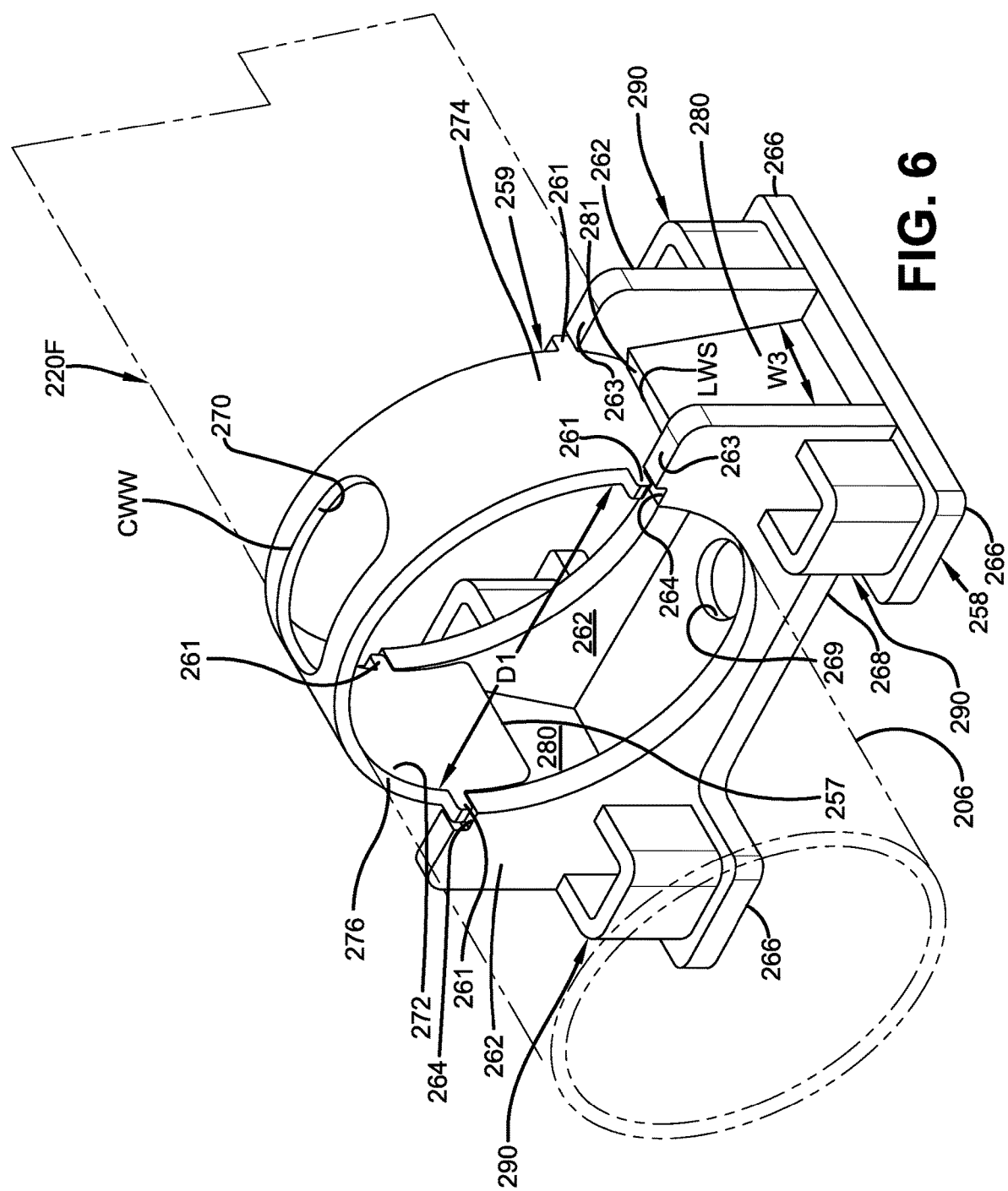

AXLE SPRING SEAT ATTACHMENT ASSEMBLY

CROSS-REFERENCE TO RELATED APPLICATION

This application claims the benefit of U.S. Provisional Patent Application No. 62/724,675, filed Aug. 30, 2018.

BACKGROUND

The subject disclosure relates generally to axle/suspension systems for heavy-duty vehicles. In particular, the subject disclosure relates to heavy-duty vehicle axle/suspension systems that utilize axle seats for leaf springs. More particularly, the subject disclosure relates to a spring seat attachment assembly for a heavy-duty vehicle axle/suspension system.

Axle/suspension systems for heavy-duty vehicles are known. For the purpose of convenience, reference is made generally to a heavy-duty vehicle with the understanding that such reference includes a truck, tractor-trailer or semi-trailer, trailer, and the like. Axle/suspension systems generally include a pair of transversely-spaced suspension assemblies connected to the primary frame of the vehicle or a subframe supported by the primary frame. Such subframes can be non-movable or movable slider boxes, slider subframes, slider undercarriages, secondary slider frames, or bogeys. For the purpose of convenience, reference will be made to a frame, with the understanding that such reference includes primary frames, non-movable and movable subframes, and the like.

The suspension assemblies of the axle/suspension system are generally mounted to an axle on respective opposite end portions of the axle, to locate or fix the position of the axle and to stabilize the heavy-duty vehicle. During operation, the wheels of the heavy-duty vehicle encounter road conditions that impart various forces to the axle on which the wheels are mounted. This, in turn, imparts various forces on the suspension assemblies connected to and supporting the heavy-duty vehicle. In order to eliminate or minimize the detrimental effect of these forces and resulting loads on the frame or other components, cargo, and occupants during heavy-duty vehicle operation, the suspension assemblies of the axle/suspension system are designed to absorb or dampen at least some of the forces.

Axle/suspension systems may be mechanical spring axle/suspension systems, which utilize mechanical suspension assemblies. In certain heavy-duty vehicles, one or more mechanical spring axle/suspension systems may be employed at the front and rear of the heavy-duty vehicle. This front axle/suspension system and rear axle/suspension system configuration is collectively known as a tandem axle/suspension system. For the purpose of convenience, reference shall be made to an axle/suspension system with the understanding that such reference includes mechanical spring axle/suspension systems and tandem axle/suspension systems. Similarly, for the purpose of convenience, reference shall be made to a suspension assembly with the understanding that such reference includes mechanical suspension assemblies. Mechanical suspension assemblies typically include a pair of transversely-spaced leaf spring sets or stacks that are connected to the axle. The leaf spring stacks are typically connected to the axle by prior art spring seat assemblies that utilize U-bolt connections to maintain the integrity of the springs. Each leaf spring stack is designed and constructed to carry the rated vertical load of its respective axle.

The prior art spring seat assembly generally includes a top block, a top axle seat, and a bottom axle seat. The top block is disposed on the upper surface of the leaf spring stack. The top axle seat extends between the bottom of the leaf spring stack and the upper portion of the axle in vertical alignment with the top block. The bottom axle seat is typically a curved plate disposed on the lower portion of the axle in vertical alignment with the top block and the top axle seat. The top axle seat and the bottom axle seat are each rigidly connected to the axle by line or window welds typically within the front and rear quadrants of the axle adjacent a neutral axis of the axle, as is known. Attachment within the front and rear quadrants of the axle is desirable because these areas generally experience less-stress than the top and bottom quadrants of the axle. Specifically, during heavy-duty vehicle operation, the top quadrant of the axle is typically under constant compression while the bottom quadrant is under constant tension. The spring seat assembly also includes a pair of U-bolts, each one of which engages the top block and extends through a pair of openings formed in the bottom axle seat. In this manner, the top block, leaf spring, top axle seat, axle, and bottom axle seat are rigidly clamped together when nuts are tightened onto the ends of the U-bolts.

Prior art spring seat assemblies, while adequately securing the axle to the leaf spring stack, have potential disadvantages, drawbacks, and limitations. For example, prior art spring seat assemblies typically require the axle to have thick central tubes because the axle spring seat assemblies are attached to the central tube of the axle by line welds. In particular, thin-wall axles are potentially more susceptible to harmful stresses from line welds, which create weak areas on the central tube. More particularly, a line weld is a weld that is initiated at one point and terminates at a separate point. The start point and the end point of the line weld create localized areas of change to the material properties of the axle and weak areas susceptible to stress, known as stress risers. Thus, when the prior art spring seat assembly is line welded to the central tube, an area adjacent each weld start and end point is created that is generally more susceptible to stress than a non-welded area or areas employing other types of welds lacking distinct start and end points. This results in the welded higher stress areas along the central tube of the axle being more susceptible than non-welded areas to potential harm from forces and loads acting upon the axle. In order to compensate for this increased susceptibility, the prior art axle/suspension systems typically increase the thickness of the central tube of the axle, which undesirably increases the weight, amount of material, and cost of manufacturing the axle/suspension system.

In addition, prior art axle/suspension systems with axle spring seats, while performing satisfactorily using line or window welds located in the front and rear quadrants of the axle, unexpectedly may potentially experience a less-than-optimal rate of wear due to cyclic forces and loads across the axle created by acceleration and deceleration of the heavy-duty vehicle and exacerbated by a loaded condition during operation.

As a result, a need exists in the art for an axle spring seat attachment assembly that overcomes the disadvantages, drawbacks, and limitations of the prior art axle spring seat assemblies. The axle spring seat attachment assembly for thin-wall axles, according to the subject disclosure, does not require the use of line welds or welds in areas of high stress, eliminating or minimizing the effect of stress risers on the axle central tube and allowing for the use of relatively thin-walled axles, which reduce the weight, amount of material, and cost of manufacturing the axle/suspension system.

SUMMARY

A summary is provided to introduce concepts of the subject disclosure. The summary is not intended to identify key factors or essential features of the subject disclosure. The summary also is not intended to limit the scope of the subject disclosure.

The spring seat attachment assembly for use with an axle/suspension system having a leaf spring and an axle, according to an aspect of the subject disclosure, includes a mounting band and at least one spring seat. The mounting band is fixed to the axle and extends around a portion of the axle between 180 degrees and 360 degrees. The spring seat receives the leaf spring and is fixed to the mounting band.

The spring seat attachment assembly for use with an axle/suspension system having a leaf spring and an axle, according to another aspect of the subject disclosure, includes a mounting band, a locating structure, and at least one spring seat. The mounting band has an opening and extends around a portion of the axle between 180 degrees and 360 degrees. The locating structure is fixed to the axle. The locating structure is at least partially separated from the mounting band and disposed within the opening of the mounting band. The spring seat receives the leaf spring and is fixed to the mounting band.

DESCRIPTION OF THE DRAWINGS

The following description and drawings set forth certain illustrative aspects and implementations of the subject disclosure. These are indicative of but a few of the various ways in which one or more aspects may be employed. Further features of the subject disclosure will become apparent to those skilled in the art to which the subject disclosure relates from reading the following description with reference to the accompanying drawings, in which:

FIG. 2 is a perspective view of a portion of a prior art axle/suspension system showing a pair of prior art spring seats line-welded to an axle;

FIG. 3 is a cross-sectional view of the axle shown in FIG. 2 taken along the line AA with the prior art spring seats and components of the braking system removed;

FIG. 4 is a fragmentary perspective view, partially in phantom, of a portion of a top mount or overslung mechanical spring axle/suspension system with a pair of axle spring seat attachment assemblies, according to an aspect of the subject disclosure, mounted about an axle;

FIG. 5 is a cross-sectional view of the axle shown in FIG. 4 taken along the line BB with the axle spring seat attachment assemblies and components of the braking system removed;

FIG. 6 is an enlarged fragmentary top perspective view, partially in phantom, of the axle spring seat attachment assembly illustrated in FIG. 4, showing the axle spring seat attachment assembly without the top spring seat;

Similar reference characters indicate similar parts throughout.

DESCRIPTION

Figure 1:
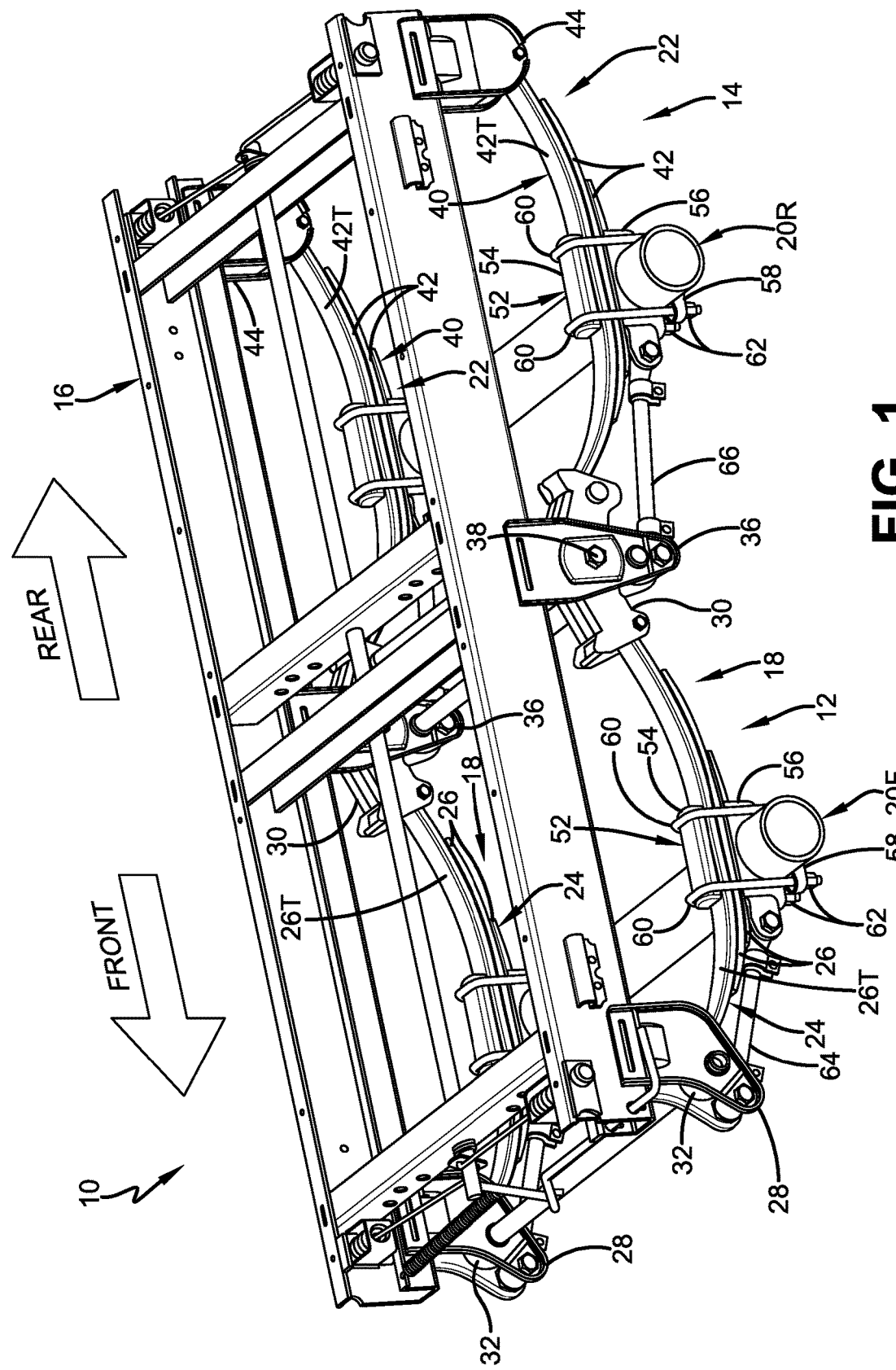
FIG. 1 is a driver side perspective view of a prior art axle/suspension system.

In order to better understand the axle spring seat attachment assembly of the subject disclosure, a prior art axle/suspension system 10 employing a prior art spring seat assembly 52 is illustrated in FIG. 1. The prior art axle/suspension system 10 utilizes a front or forward axle/suspension system 12 and a rear or rearward axle/suspension system 14, both illustrated in a top mount or overslung configuration. Each of the front and rear axle/suspension systems 12, 14, respectively, is connected to, and depends from, a vehicle frame 16.

The front axle/suspension system 12 includes a pair of mirror-image, transversely-spaced, longitudinally-extending suspension assemblies 18 connected to a front axle 20F. Similarly, the rear axle/suspension system 14 includes a pair of mirror-image, transversely-spaced, longitudinally-extending suspension assemblies 22 connected to a rear axle 20R. Since the front suspension assemblies 18 are mirror images of each other and the rear suspension assemblies 22 are mirror images of each other, only one of each will be described.

The front suspension assembly 18 includes a leaf spring stack 24 disposed above and connected to the front axle 20F. The leaf spring stack 24 includes a plurality of individual leaf springs 26 having a top leaf spring 26T. The top leaf spring 26T of the leaf spring stack 24 extends longitudinally between a front hanger 28, which is mounted on and depends from the frame 16, and a rocker or equalizer 30. A front end 32 of the top spring 26T is formed to enable the front end of the top spring to rest on and engage a cam or slipper block (not shown) that is mounted in the front hanger 28. A rear end (not shown) of top spring 26T is formed to enable the rear end to rest on and engage another cam or slipper block (not shown) that is mounted in the equalizer 30. The equalizer 30 is pivotally connected to a center hanger 36 by a pin and bushing assembly 38. The center hanger 36 is mounted on and depends from frame 16. This construction enables the top spring 26T and the leaf spring stack 24 to float or slide at the front and center hangers 28, 36, respectively, in order to respond to certain load conditions.

The rear suspension assembly 22 similarly includes a rear spring stack 40 connected to and disposed above the rear axle 20R. The rear spring stack 40 includes a plurality of individual leaf springs 42 with a top spring 42T. The top spring 42T of each rear spring stack 40 extends longitudinally between a rear hanger 44, which depends from the frame 16, and the equalizer 30. A front end (not shown) of the top spring 42T is formed such that the front end is capable of resting on and engaging a cam or slipper block (not shown) that is mounted in the equalizer 30. The equalizer 30 provides a connection between the front and rear suspension assemblies 18, 22, respectively, and pivots in order to balance the loads between front and rear axles 20F, 20R, respectively. A rear end (not shown) of the top spring 42T is formed such that the rear end is capable of resting on and engaging another cam or slipper block (not shown) that is mounted in the rear hanger 44. Thus, the top spring 42T and the rear spring stack 40 are able to float or slide at the center hanger 36 and the rear hanger 44, respectively, to respond to certain load conditions.

The plurality of leaf springs 26, 42 of the leaf spring stacks 24, 40 are held together by a center bolt (not shown) and attached to the axles 20F, 20R, respectively, by spring seat assemblies 52. The center bolt extends through an opening (not shown) formed in each one of the leaf springs 26, 42 at about the longitudinal midpoint of each, interconnecting the leaf springs.

Each spring seat assembly 52 includes a top block 54, a top axle seat or spring seat 56, and a bottom axle seat or spring seat 58. The top block 54 is disposed on the upper surface of the top spring 26T at about the longitudinal midpoint of the top spring. The top spring seat 56 is located between the bottom of the leaf spring stack 24 and a top portion of the front axle 20F in vertical alignment with the top block. The bottom spring seat 58 is disposed on a bottom portion of the front axle 20F in vertical alignment with the top block 54 and the top spring seat 56. The spring seat assembly 52 also includes a pair of U-bolts 60, each one of which engages the top block 54 and extends downwardly through a pair of openings (not shown) formed in the bottom spring seat 58. This allows the top block 54, leaf spring stack 24, top spring seat 56, axle 20F, and bottom spring seat 58 to be tightly clamped together when nuts 62 are tightened onto threaded portions of the U-bolts 60. Similarly, the leaf springs 42 of the rear spring stack 40 are held together by a center bolt (not shown) and are clamped to the rear axle 20R by the spring seat assembly 52 and the U-bolts 60.

In order to control fore-aft movement of the front axle 20F, a front torque arm or radius rod 64 is pivotally connected to, and extends between, the front hanger 28 and the top spring seat 56 of the front axle. To control fore-aft movement of the rear axle 20R, a rear radius rod 66 is pivotally connected to, and extends between, the center hanger 36 and the top spring seat 56 of the rear axle.

A portion of the prior art spring seat assembly 52 is illustrated in FIG. 2 fixed to the axle 20F. The axle 20F includes a central tube 106 and a pair of axle spindles 108 connected to respective ends of the central tube by any suitable means, such as welds. A torque plate or brake spider 110 may be mounted on each of the axle spindles 108. With additional reference to FIGS. 3-4, the axle 20F also includes a horizontal neutral axis plane N, a top quadrant Q1, a rear quadrant Q2, a bottom quadrant Q3, and a front quadrant Q4.

The prior art top spring seat 56 generally has an inverted U-shape that enables the top spring seat to at least partial surround the axles 20F, 20R. Specifically, the inverted U-shape of the prior art top spring seat 56 is configured to facilitate seating on, and direct clamping to, the axles 20F, 20R. Additionally, the prior art top spring seat 56 is typically directly attached to the axles 20F, 20R in the front and rear quadrants Q4, Q2, respectively, of the axles by line welds LWS formed between the top spring seats and axles. The line welds LWS are generally disposed within the front and rear quadrants Q4, Q2, respectively, of the axles 20F, 20R along or adjacent to the neutral axis plane N because the front and rear quadrants and the neutral axis are exposed to relatively less stress than the top and bottom quadrants Q1, Q3, respectively.

Prior art spring seat assemblies 52, while adequately securing the axles 20F, 20R to the leaf spring stacks 24, 40, have potential disadvantages, drawbacks, and limitations. For example, the spring seat assemblies 52 require the use of line welds LWS to connect the spring seat assembly to the axles 20F, 20R. As a result, the start and end points of the line welds LWS may create stress risers and local mechanical property changes in the central tube 106 of the axles 20F, 20R, weakening the central tube. In order to compensate for the stress risers, the thickness of the central tube 106 is typically increased. As a result, the weight, amount of material, and cost of manufacture of the axles 20F, 20R are undesirably increased, reducing fuel efficiency and increasing operational cost of the heavy-duty vehicle.

Moreover, the prior art top spring seat 56 may, unexpectedly, experience increased wear due to attachment in the front and rear quadrants Q4, Q2, respectively, of axles 20F, 20R. More specifically, alternating forces applied to the axles 20F, 20R by acceleration and deceleration of the heavy-duty vehicle and exacerbated by load cause sinusoidal stress variation from tension to compression leading to reverse cycling fatigue in the front and rear quadrants. This reverse cycling fatigue may disrupt the connection of the line welds LWS between top spring seat 56 and the central tube 106, potentially causing damage.

Thus, a need exists for an axle spring seat attachment assembly for axle/suspension systems that minimizes use of line welds, reduces stress risers, and provides better attachment of the spring seat to the axle. The axle spring seat attachment assembly for an axle/suspension system of the subject disclosure satisfies this need and enables use of a thin-wall axle, reducing the weight, amount of materials, and cost of manufacturing the axle/suspension system.

A pair of axle spring seat attachment assemblies 252, according to an aspect of the subject disclosure, is illustrated in FIGS. 4-8. The axle spring seat attachment assemblies 252 are shown incorporated into an axle/suspension system 200. The axle/suspension system 200 includes a thin-wall transversely-extending axle 220 with a neutral axis N' (FIG. 5), a top quadrant Q1', a rear quadrant Q2', a bottom quadrant Q3', and a front quadrant Q4'. The axle 220 includes a central tube 206 and a pair of axle spindles 208 mounted on respective ends of the central tube. A pair of torque plates or brake spiders 210 may be mounted on respective axle spindles 208. The axle/suspension system 200 is in a top mount, or overslung, configuration in which a longitudinally-extending leaf spring stack 224 (FIG. 4) is typically disposed above or over the axle 220. However, it is contemplated that the axle spring seat attachment assemblies 252 may be utilized in any other types and/or configurations of axle/suspension systems.

The axle spring seat attachment assemblies 252 each have an upper or top bracket or spring seat 256 and a bottom spring seat 258 rigidly fixed to a mounting band 259 (FIG. 6) by any suitable means, such as welding. Each mounting band 259 is disposed at least partially about, and is in intimate contact with, the axle 220. In particular, the mounting band 259 extends around the central tube 206 at least 180 degrees, but less than 360 degrees. More particularly, the mounting band 259 has an arcuate recess or inner surface 272 that is complementary to the periphery of the upper half of the central tube 206 of the axle 220. The inner surface 272 defines a dimension D1 which can range from significantly smaller than to generally the same size as an outer diameter of the smallest central tube 206 to which the mounting band 259 will be mounted, depending upon the method of mounting. The mounting band 259 is oriented such that opposite ends 257 (only one shown) of the mounting band are located within the front and rear quadrants Q4', Q2', respectively, of the axle 220.

The mounting band 259 is disposed about or snapped onto the axle 220 by the application of an appropriate amount of transverse force using any suitable means, such as a hydraulic press (not shown), or through an appropriate tool or adapter, such as a clamping system (not shown), such that the inner surface 272 of the mounting band is in contact with the axle. Specifically, the appropriate amount of force is applied transversely across the axle 220 by the hydraulic press to an outer surface 274 of the mounting band 259. The appropriate amount of force applied to the outer surface 274 may elastically deform the mounting band 259 in the area about which the mounting band is disposed.

The fitting of the inner surface 272 of the mounting band 259 onto the axle 220 goes beyond mere force-fitting. While force-fitting the inner surface 272 of the mounting band 259 onto the axle 220 generally creates uninterrupted contact, it also leaves intermittent areas of clearance at the interface between the outer surface of the upper portion of the axle and the inner surface of the mounting band. As a result, areas of clearance at critical regions between the axle 220 and the mounting band 259 may remain. However, the appropriate amount of force applied to the outer surface 274 provides intimate contact beyond force, press, or interference fit. Specifically, the appropriate amount of force applied to the mounting band 259, bearing on axle 220, eliminates any significant clearance between the outer surface of the upper portion of the axle and the inner surface 272 of the mounting band. The intimate contact condition may exist without actual deformation of axle 220 if there is a lack of clearance between the axle and the mounting band 259, especially in critical regions between the axle and the mounting band, such as where a weldment may be formed. This intimate contact provides a constant relatively low preload or compression condition between the central tube 206 and the mounting band 259, which significantly restricts relative motion between the central tube and the mounting band. The intimate contact dissipates various stresses and improves the reverse cycling fatigue resistance, preventing potentially adverse effects on the integrity of the axle 220 or welds between the mounting band 259 and the axle.

A window 270 (FIGS. 6-8) is formed in the mounting band 259 generally over or adjacent to the top quadrant Q1' of the axle 220. This allows placement of a continuous window weld CWW (FIG. 6) in window 270 between the mounting band 259 and the central tube 206 of the axle 220 to supplement the preload condition and enhance securement of the mounting band to the axle. The continuous window weld CWW starts and stops at the same location within the window 270, such that it has no start or end points. As a result, stress risers in axle 220 from distinct start and end points of welds may be reduced and/or eliminated. The reduction of stress risers eliminates the need for thicker-walled or heavier prior art axles and allows for the use of the thin-wall axle 220. Placement of the continuous window welds CWW on the top quadrant Q1' of the axle 220 also unexpectedly results in a more secure connection between the central tube 206 and the mounting band 259 that experiences reduced wear as compared to the prior art spring seat assemblies 52 attached to the front and/or rear quadrant Q4, Q2, respectively, of axles 20F, 20R with line welds or window welds. The improvement in the connection is due, at least in part, to constant compression placed on the continuous window weld CWW from the weight or load of the heavy-duty vehicle. Specifically, during heavy-duty vehicle operation, the top quadrant Q1' of the axle 220, in which the continuous window weld CWW is located, is typically under constant compression. As a result of this constant compression on the continuous window weld CWW, reverse cycling fatigue caused by acceleration and braking of the heavy-duty vehicle, and the resultant vertical and fore-aft loads, is reduced or eliminated.

The top spring seat 256 (FIGS. 7-8) has an inverted general U-shape to surround a portion of the central tube 206. The top spring seat 256 includes a pair of sidewalls 246, a pair of end walls 250, and a spring wall 248. The sidewalls 246, the end walls 250, and the spring wall 248 are separately formed and joined together into a subassembly by suitable means, such as welds. Alternatively, the sidewalls 246, the end walls 250, and the spring wall 248 may be integrally formed as a single piece by any suitable method, such as casting or forging. The spring wall 248 is substantially planar with a generally rectangular shape. The spring wall 248 has a pair of recesses 249 formed into each side. The spring wall 248 is formed with an opening 234 to accept a dowel or center bolt (not shown) that may extend through the leaf spring stack 224.

The pair of sidewalls 246 extend longitudinally in parallel and are spaced a width W1 (FIGS. 7 and 8) apart from each other. The sidewalls 246 also extend substantially orthogonally from the spring wall 248. The sidewalls 246 include a pair of projections or tabs 247 that extend toward the spring wall 248. The tabs 247 are each received in a respective one of the pair of recesses 249 of the spring wall 248 to retain the sidewalls 246 to the spring wall. Each of the sidewalls 246 may also include a forwardly- or rearwardly-extending bracket portion 237. The bracket portion 237 has a pair of transversely-aligned openings 239 for receiving a fastener (not shown) for connection to a radius rod (not shown). Each sidewall 246 has an inverted general U-shape, such that each sidewall complementarily receives the central tube 206 in a press fit, or interference fit, manner. It is contemplated that the sidewalls 246 of the subject disclosure could also receive the central tube 206 in a clearance fit manner.

The end walls 250 are disposed between and orthogonal to the sidewalls 246. The end walls 250 may extend inwardly from longitudinally-opposite ends of the spring wall 248 at angles toward the central tube 206, forming opposing slopes. Alternatively, the end walls 250 may extend orthogonally from longitudinally-opposite ends of the spring wall 248. The end walls 250 generally extend such that bottom ends 255 (FIG. 7) of the end walls are recessed from bottom ends 245 of the sidewalls 246. Alternatively, the end walls 250 may extend such that the bottom ends 255 of the end walls are coplanar with or extend beyond the bottom ends 245 of sidewalls 246. Each of the end walls 250 includes a projection or tab 251, which extends toward the spring wall 248. The tabs 251 engage and extend into corresponding slots 253 formed in the spring wall 248 to secure the end walls 250 to the spring wall.

Figure 7:
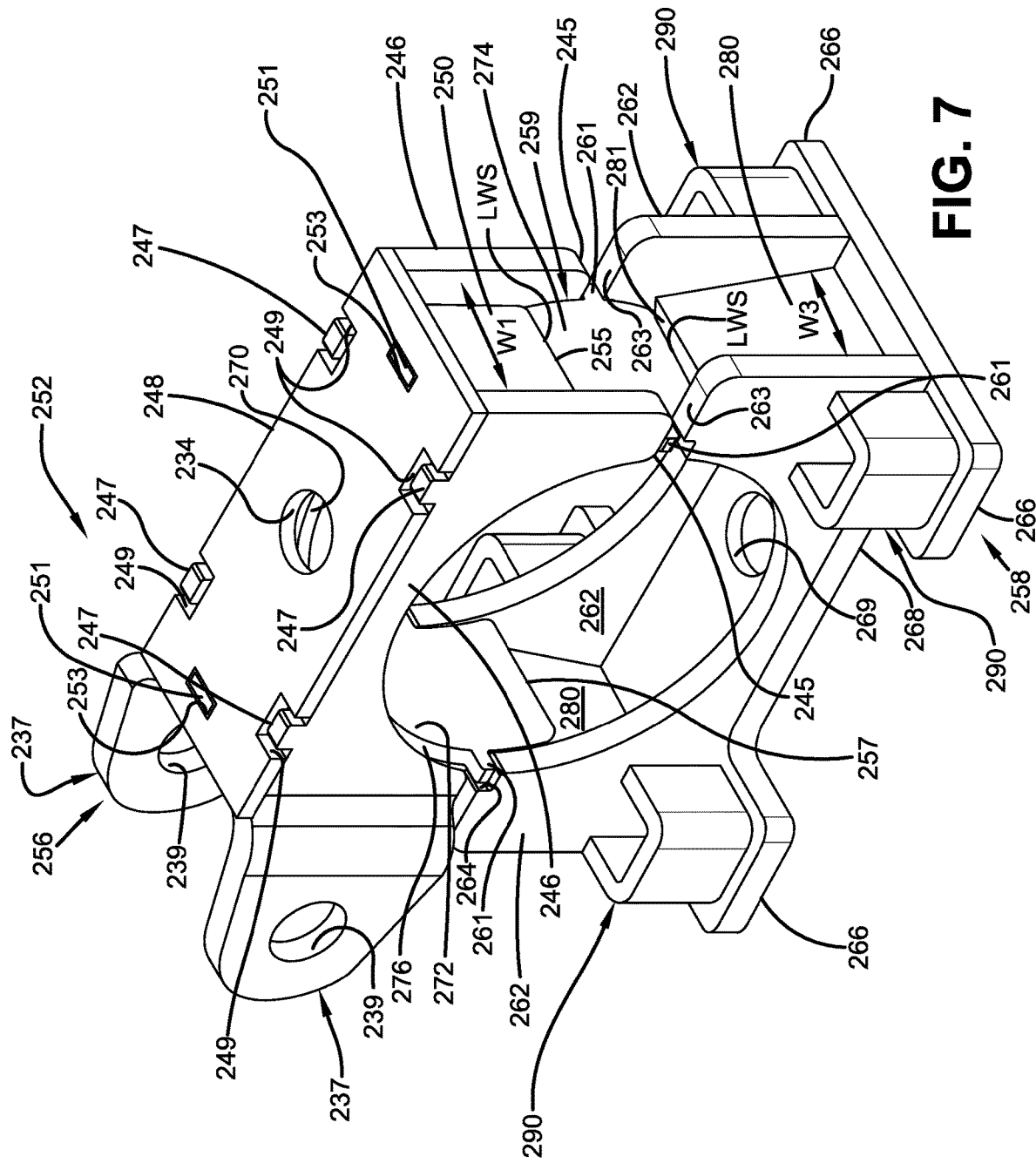
FIG. 7 is an enlarged top perspective view of the axle spring seat attachment assembly shown in FIG. 4, with the axle removed.
Figure 8:
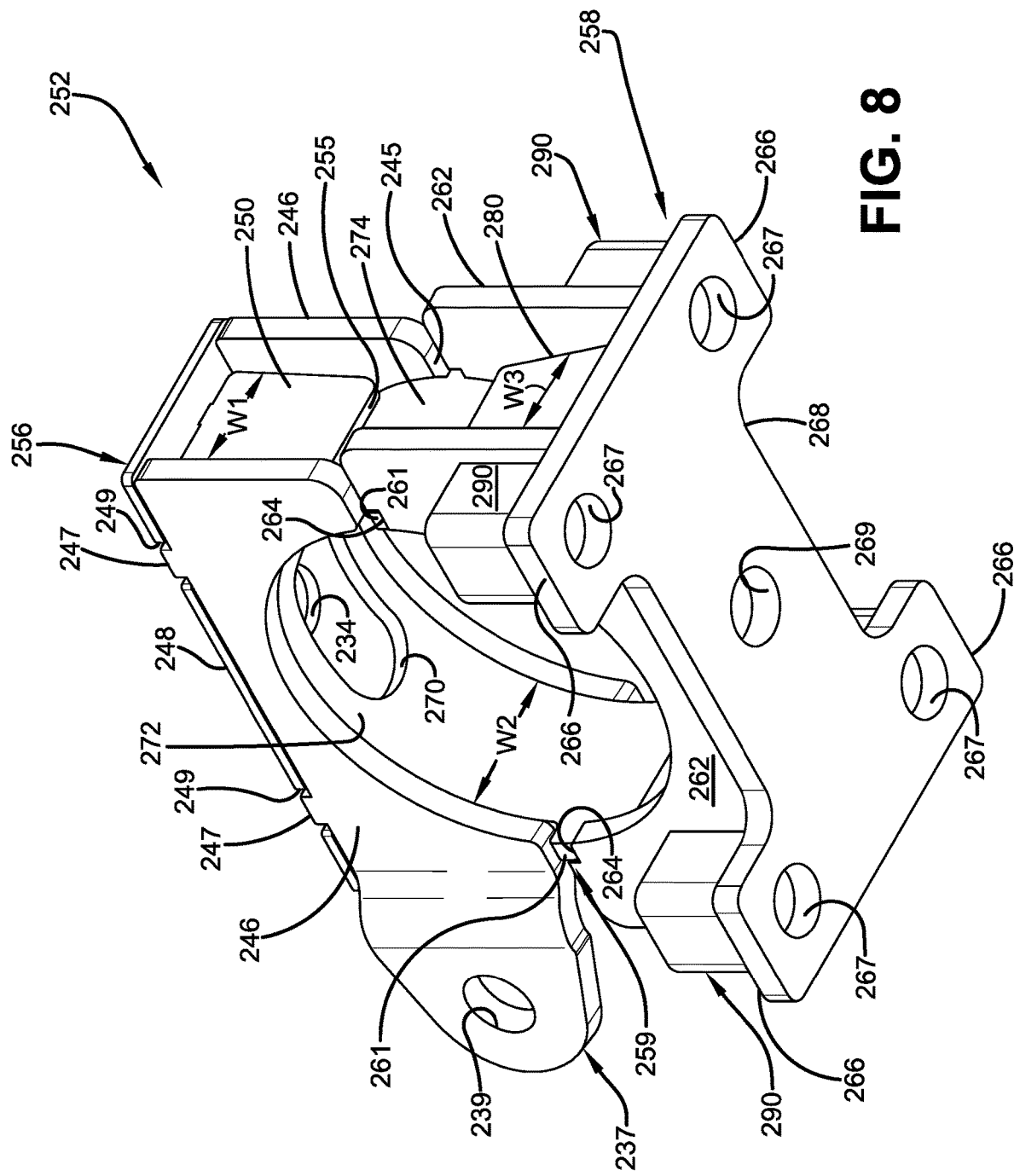
FIG. 8 is a bottom perspective view of the axle spring seat attachment assembly shown in FIGS. 4 and 7.

In accordance with an important aspect of the subject disclosure, the top spring seat 256 is indirectly attached to the axle 220. In particular, the top spring seat 256 is disposed over and fixed only to the mounting band 259 once the mounting band has been attached to the central tube 206. The top spring seat 256 may be positioned over the mounting band 259 such that the opening 234 in the spring wall 248 may be at least substantially adjacent or aligned with the window 270 of the mounting band. The mounting band 259 has a width W2 (FIG. 8) that is less than the width W1 extending between the sidewalls 246 of the top spring seat 256. The top spring seat 256 may then be disposed about a portion of the axle 220, such that a large portion of the mounting band 259 is located between sidewalls 246. It is also contemplated that portions of the mounting band 259 adjacent each of the opposite ends 257 may extend about the axle circumference beyond the bottom ends 245 of the sidewalls 246 and may not be disposed between the sidewalls, as illustrated in FIG. 7. The sidewalls 246 may receive edges 276 of the mounting band 259 in a clearance manner. Alternatively, the sidewalls 246 may receive the edges 276 in a press fit or interference fit manner. The end walls 250 form interfaces with the outer surface 274 of the mounting band 259. Line welds LWS are formed along the interfaces between the outer surface 274 of the mounting band 259 and the end walls 250 of the top spring seat 256 to secure the top spring seat to the mounting band. Once cooled, the line welds LWS create tension that maintains the intimate contact between the mounting band 259 and the axle 220.

The bottom spring seat 258 is similar in structure and arrangement to the top spring seat 256. Specifically, the bottom spring seat 258 is generally U-shaped to surround a portion of the axle 220. The bottom spring seat 258 includes a bottom plate 268, a pair of sidewalls 262, and a pair of inclined end walls 280. The sidewalls 262, the end walls 280, and the bottom plate 268 are formed separately and joined into a subassembly by any suitable means, such as welds. Alternatively, the sidewalls 262, the end walls 280, and the bottom plate 268 may be integrally formed as a single piece by any suitable method, such as casting or forging. The bottom plate 268 is substantially planar and generally rectangular. The bottom plate 268 includes one or more, but preferably four, integrally formed tabs 266 coplanar with the bottom plate. Each of the tabs 266 is adjacent to and extends outwardly from a respective corner of the bottom plate 268. The bottom plate 268 may be formed with an opening 269 for receiving a dowel or pin (not shown) extending through the leaf spring stack 224.

The sidewalls 262 extend longitudinally in parallel and are spaced a width W3 (FIG. 6-8) apart from each other. The sidewalls 262 also extend orthogonally from the bottom plate 268 adjacent the tabs 266, such that the tabs extend perpendicularly away from the sidewalls 262 in opposite directions. Each sidewall 262 has a general U-shape of the bottom spring seat 258, such that each sidewall complementarily receives the central tube 206 in a press fit, or interference fit, manner. It is also contemplated that the sidewalls 262 may receive the central tube 206 in a clearance fit manner.

Each tab 266 of the bottom plate 268 is formed with a respective opening 267. Each of the openings 267 receives an end of one of a pair of U-bolts (not shown), which form the primary connection between the leaf spring stack 224 and the central tube 206, as is known. A series of guide walls 290 may be integrally formed with and extend orthogonally from the tabs 266. The guide walls 290 are adjacent and may abut or be connected to the side walls 262. The guide walls 290 at least partially surround the threaded and/or shank portions of the U-bolts. The U-bolts may engage the guide walls 290 during operation of the heavy-duty vehicle. The guide walls 290 provide structure over which lateral forces and fore-aft forces acting on the U-bolts may be distributed. As a result, the tabs 266 of the bottom plate 268 are less likely to be deformed by forces acting on the U-bolts.

The end walls 280 of bottom spring seat 258 extend from longitudinally-opposite ends of the bottom plate 268 at angles toward the central tube 206, forming opposing slopes. Each end wall 280 is orthogonal to, and disposed between, the sidewalls 262. The end walls 280 generally extend such that top ends 281 of the end walls are recessed from top ends 263 of the sidewalls 262. Alternatively, the end walls 280 may extend such that the top ends 281 of the end walls are coplanar with or extend beyond the top ends 263 of sidewalls 262.

In accordance with another important aspect of the subject disclosure, the bottom spring seat 258 is indirectly attached to the axle 220. In particular, the bottom spring seat 258 is disposed at least partially over and fixed only to the mounting band 259. Specifically, the width W2 of the mounting band 259 is equal to or less than the width W3 extending between the sidewalls 262. The bottom spring seat 258 may be disposed about the central tube 206 of the axle 220, such that portions of the mounting band 259 adjacent each of the opposite ends 257 are disposed between the sidewalls 262. As a result, the sidewalls 262 overlap a circumferential length (not shown) of the edges 276 of the mounting band 259. The mounting band 259 may include a pair of lateral projections or tabs 261 (FIGS. 6-8) extending from each edge 276 of the mounting band. Once the bottom spring seat 258 is placed about the mounting band 259, the tabs 261 engage respective notches 264 formed in the top ends 263 of the sidewalls 262. Thus, the tabs 261 allow proper positioning of the bottom spring seat 258 relative to the mounting band 259. The sidewalls 262 may receive the edges 276 of the mounting band 259 in a clearance fit manner. Alternatively, the sidewalls 262 may receive the edges 276 in a press fit or interference fit manner. The end walls 280 form respective interfaces with the outer surface 274 of the mounting band 259. Line welds LWS are formed along the interfaces between the outer surface 274 and the end walls 280 to secure the bottom spring seat 258 to the mounting band 259.

Thus, the axle spring seat attachment assembly 252, according to the subject disclosure, eliminates the use of line welds on the axle 220, eliminating or minimizing the formation and/or effect of stress risers and allowing the use of thin-wall axle 220, which desirably reduces the weight and amount of materials and cost of manufacturing of the axle/suspension system 200. The axle spring seat attachment assembly 252 unexpectedly provides an improved connection due to the constant compression on the continuous window weld CWW from the load of the heavy-duty vehicle, reducing or eliminating the reverse cycling fatigue and potential damage caused by the resultant vertical and fore-aft loads acting on the axle seat attachment assemblies.

Figure 9:
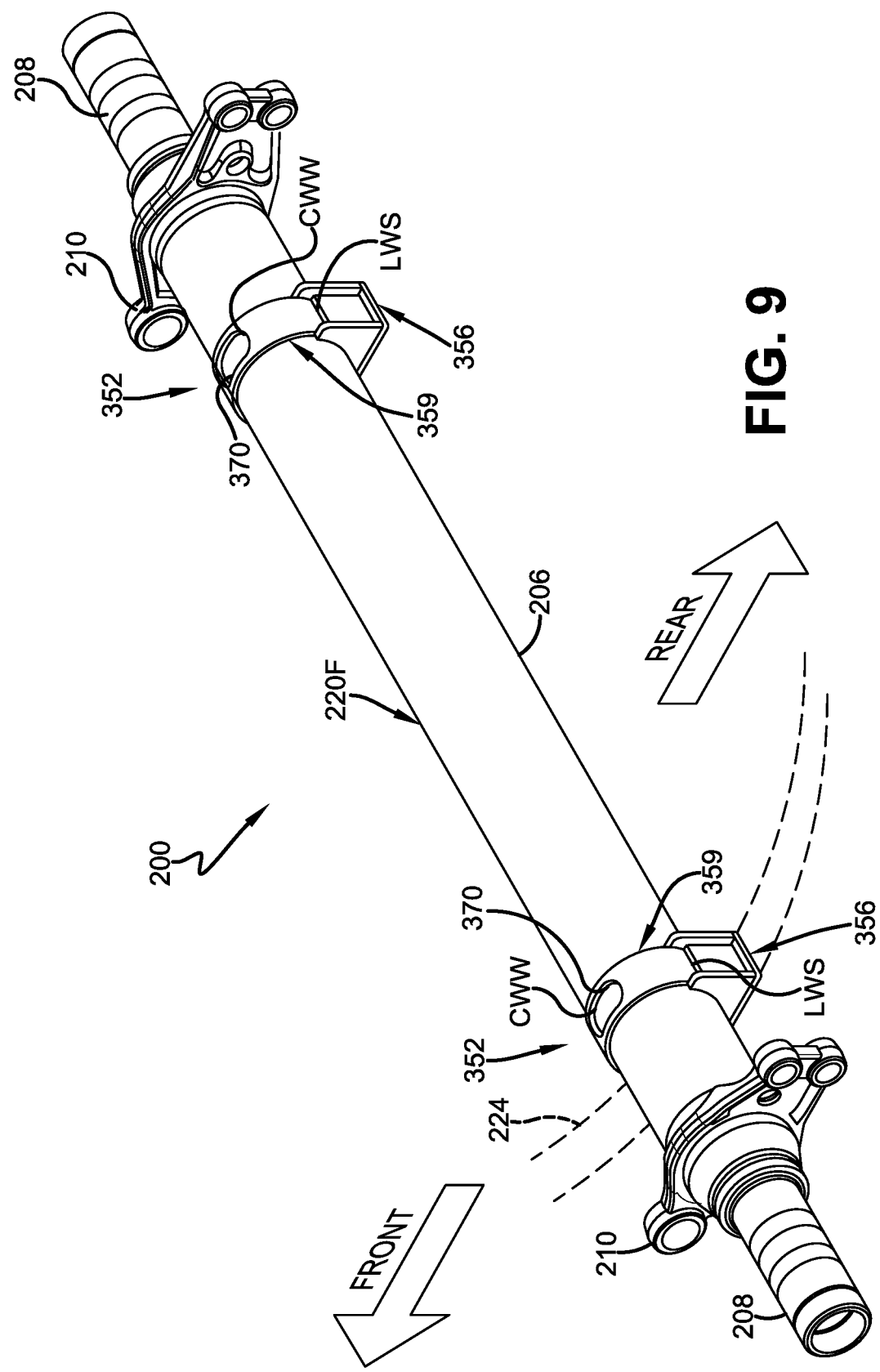
FIG. 9 is a fragmentary perspective view, partially in phantom, of a portion of a bottom mount or underslung mechanical spring axle/suspension system with a pair of axle spring seat attachment assemblies, according to another aspect of the subject disclosure, mounted on an axle.
Figure 10:
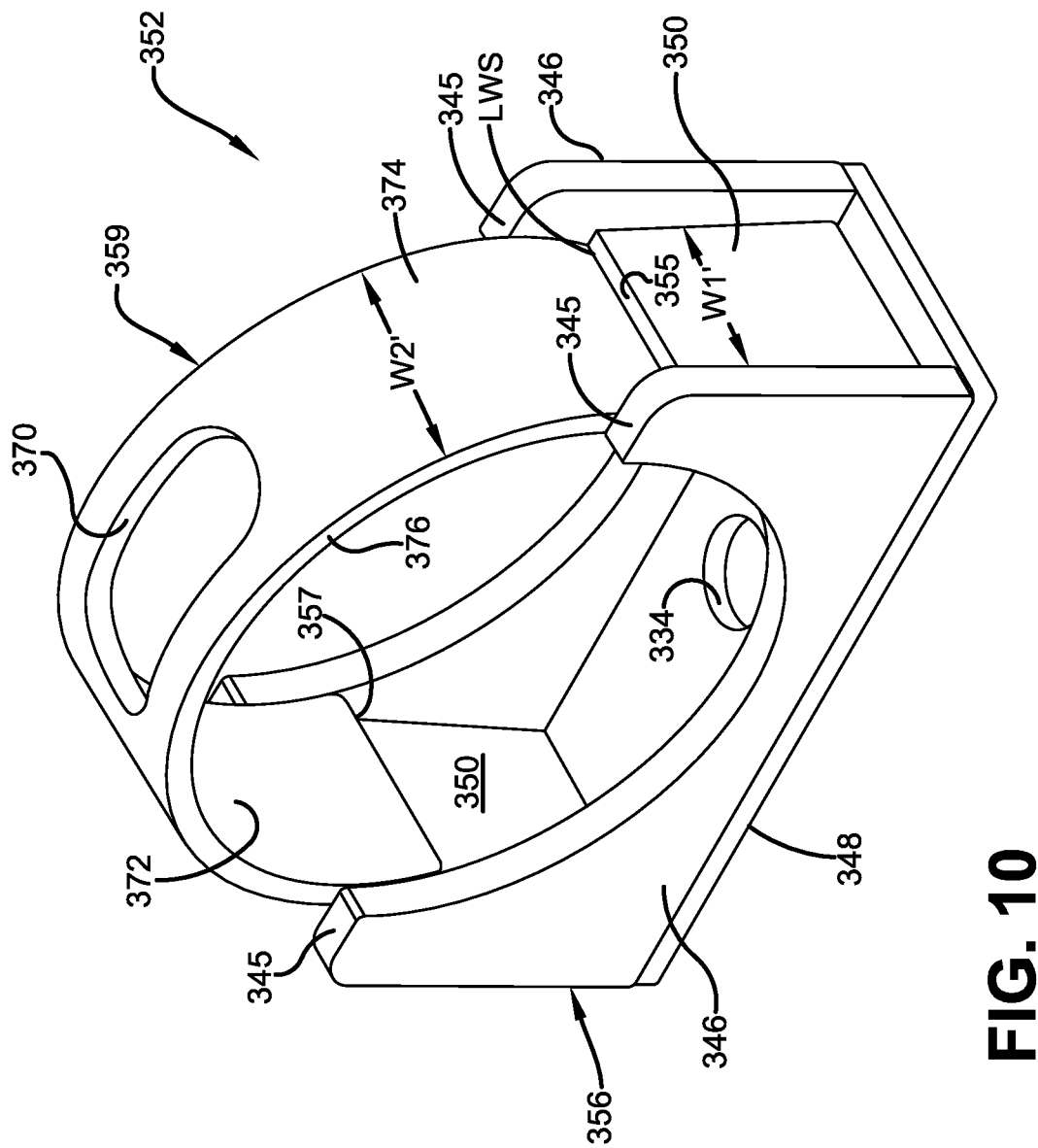
FIG. 10 is an enlarged perspective view of the axle spring seat attachment assembly illustrated in FIG. 9, with the axle removed.
Figure 11:
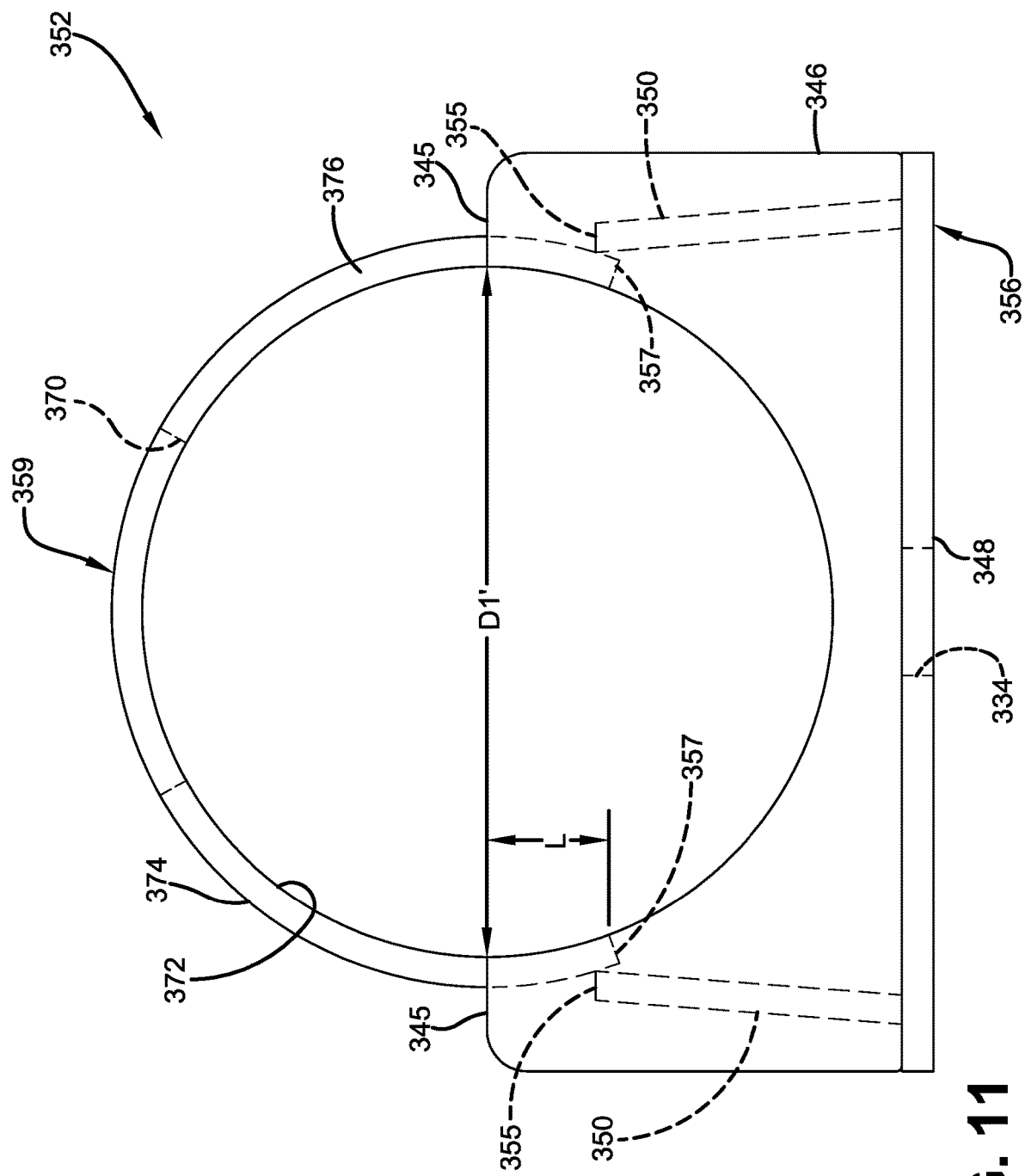
FIG. 11 is an elevational view, partially in phantom, of the axle spring seat attachment assembly illustrated in FIGS. 9 and 10.
Figure 12:
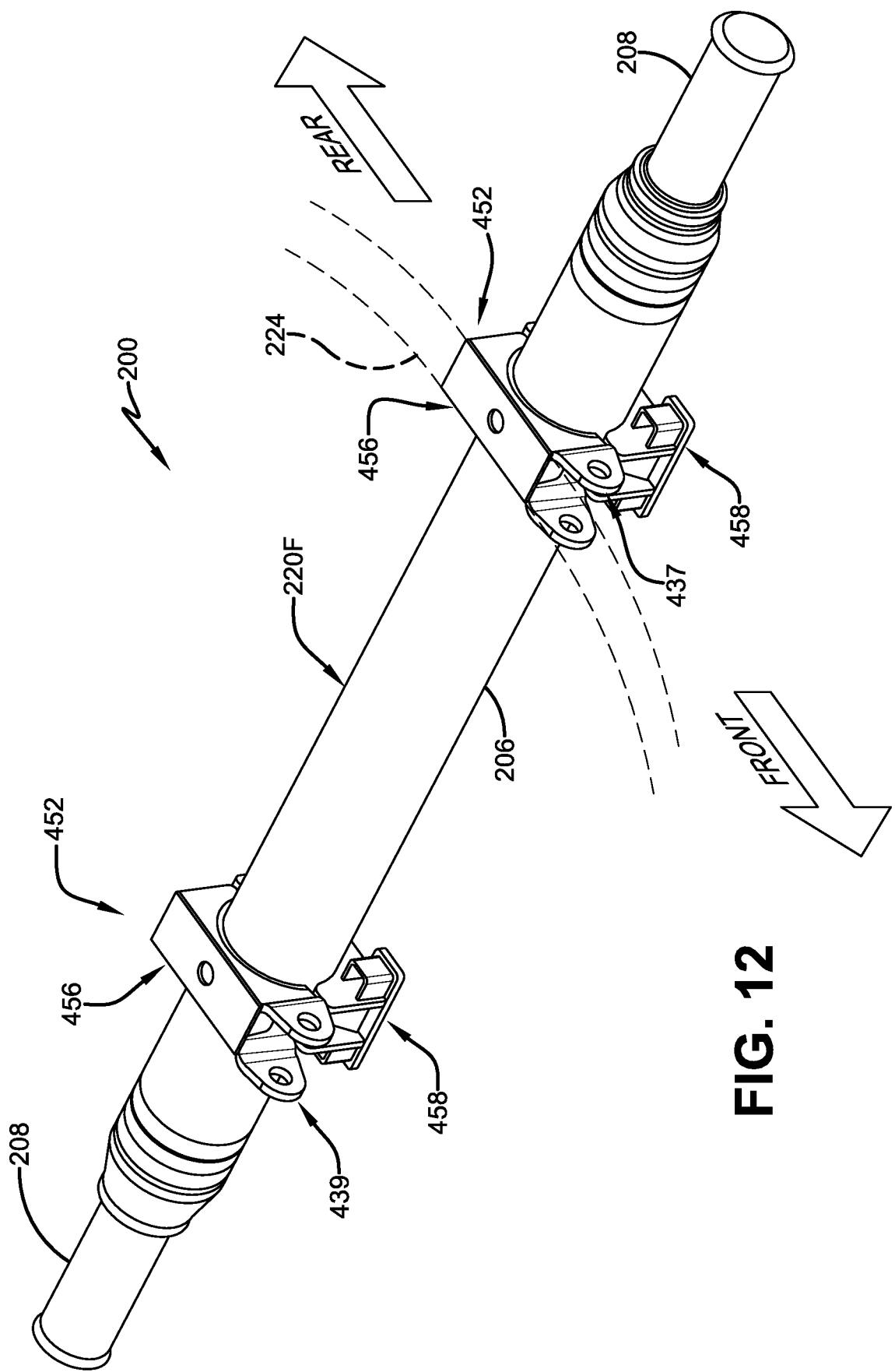
FIG. 12 is a fragmentary perspective view, partially in phantom, of a portion of a top mount or overslung mechanical spring axle/suspension system with a pair of axle spring seat attachment assemblies, according to an yet another aspect of the subject disclosure, mounted about an axle.

A pair of axle spring seat attachment assemblies 352, according to another aspect of the subject disclosure, is illustrated in FIGS. 9-11 attached to a thin-wall axle 220. The axle spring seat attachment assemblies 352 are illustrated in a bottom mount, or underslung, configuration in which a leaf spring stack 224 is typically disposed below or under the axle 220. However, it is contemplated that the axle spring seat attachment assemblies 352 may be utilized in any other types and/or configurations of axle/suspension systems, such as axle/suspension 200 described above.

Each axle spring seat attachment assembly 352 includes a spring seat 356 fixed to a mounting band 359 by suitable means, such as welding. Each mounting band 359 is disposed at least partially about, and is in intimate contact with, the axle 220. The mounting band 359 extends around the central tube 206 at least 180 degrees, but less than 360 degrees. More particularly, the mounting band 359 has an arcuate recess or inner surface 372 (FIG. 10) that is complementary to the periphery of the upper half of the central tube 206 of the axle 220. The inner surface 372 defines a dimension D1' (FIG. 11), which can range from significantly smaller than to generally the same size as an outer diameter of the smallest central tube 206 to which the mounting band 359 will be mounted, depending upon the method of mounting. The mounting band 359 is oriented such that opposite ends 357 of the mounting band are each located in a respective one of the front and rear quadrants Q4', Q2' (FIG. 5), respectively, of the axle 220.

The mounting band 359 is disposed about or snapped onto the axle 220 by the transverse application of an appropriate amount of force using any suitable means, such as a mechanical or hydraulic press (not shown), or through an appropriate tool or adapter, such as a clamping system (not shown), such that the inner surface 372 of the mounting band is in contact with the axle. Specifically, the appropriate amount of force is applied transversely across the axle by the hydraulic press to an outer surface 374 of the mounting band 359. The appropriate amount of force applied to the outer surface 374 may elastically deform the mounting band 359 in the area about which the mounting band is disposed.

The fitting of the inner surface 372 of the mounting band 359 onto axle 220 goes beyond mere force-fitting. Force-fitting the inner surface 372 of the mounting band 359 onto the axle 220 generally creates uninterrupted contact, but also leaves intermittent areas of clearance at the interface between the outer surface of the upper portion of the axle and the inner surface of the mounting band. As a result, areas of clearance at critical regions between the axle 220 and the mounting band 359 may remain. However, the appropriate amount of force applied to the outer surface 374 provides intimate contact beyond force, press, or interference fit. Specifically, the appropriate amount of force applied to the mounting band 359, bearing on the axle 220, eliminates any significant clearance between the outer surface of the upper portion of the axle and the inner surface 372 of the mounting band. The intimate contact may exist without actual deformation of the axle 220 if there is a lack of clearance between the axle and the mounting band 359, especially in critical regions between the axle and the mounting band, such as where a weldment may be formed. This intimate contact provides a constant relatively low preload or compression condition between the central tube 206 and the mounting band 359, which significantly restricts relative motion between the central tube and the mounting band. The intimate contact dissipates various stresses and improves the reverse cycling fatigue resistance, preventing adverse effects on the integrity of the axle 220 or welds between the mounting band 359 and the central tube 206.

A window 370 is formed in the mounting band 359 generally over or adjacent to the top quadrant Q1' of the axle 220. This allows placement of a continuous window weld CWW (FIG. 9) in the window 370 between the mounting band 359 and the axle central tube 206 to supplement the preload condition and enhance securement of the mounting band to the axle. The continuous window weld CWW starts and stops at the same point within the window 370, such that the continuous window weld has no start or end points. As a result, stress risers from distinct start and end points may be reduced and/or eliminated. The reduction of stress risers eliminates the need for thicker-walled or heavier prior art axles and allows for the use of the thin-wall axle 220. Placement of the continuous window welds CWW on the top quadrant Q1' of the axle 220 also unexpectedly results in a more secure connection with less wear than prior art spring seat assemblies 52 welded to the front and rear quadrant Q4, Q2, respectively, of axle 20F whether with line or window welds. The improved connection is due, at least in part, to constant compression on the continuous window weld CWW from the weight or load of the heavy-duty vehicle. Specifically, during heavy-duty vehicle operation, the top quadrant Q1' of the axle 220, in which the continuous window weld CWW is located, is typically under constant compression. As a result of the constant compression on the continuous window weld CWW, reverse cycling fatigue caused by acceleration and braking of the heavy-duty vehicle, and the resultant vertical and fore-aft loads, is reduced or eliminated.

The spring seat 356 has a general U-shape to surround a portion of the axle 220. The spring seat 356 includes a pair of sidewalls 346, a pair of end walls 350, and a spring wall 348. The sidewalls 346, the end walls 350, and the spring wall 348 are separately formed and joined into a subassembly using suitable methods, such as welding. Alternatively, the sidewalls 346, the end walls 350, and the spring wall 348 may be integrally formed as a single piece by any suitable method, such as casting or forging. The spring wall 348 is substantially planar and generally rectangular in shape. The spring wall 348 is formed with an opening 334 to accept a dowel, pin, or the center bolt (not shown) that may extend through the leaf spring stack 224. The sidewalls 346 extend longitudinally in parallel and are spaced a width W1' (FIG. 10) apart from each other. The sidewalls 346 also extend substantially orthogonally from the spring wall 348. Each sidewall 346 has a general U-shape, such that each sidewall complementarily receives the central tube 206 in a press fit, or interference fit, manner. It is contemplated that the sidewalls 346 could also receive the central tube 206 in a clearance fit manner.

The end walls 350 are disposed between, and orthogonal to, the sidewalls 346. The end walls 350 extend from longitudinally-opposite ends of the spring wall 348 at angles toward the central tube 206, forming opposing slopes. Alternatively, the end walls 350 may extend orthogonally from longitudinally opposite ends of the spring wall 348. The end walls 350 generally extend, such that top ends 355 of the end walls are spaced from top ends 345 of the sidewalls 346. Alternatively, the end walls 350 may extend, such that the top ends 355 of the end walls are coplanar with or extend beyond the top ends 345 of the sidewalls 346.

In accordance with another important aspect of the subject disclosure, the spring seat 356 is indirectly attached to the axle 220. In particular, the spring seat 356 is disposed over and fixed only to the mounting band 359 after the mounting band is attached to the central tube 206. The mounting band 359 has a width W2' that is less than W1' of the spring seat 356. The spring seat 356 may then be disposed about the axle 220, such that portions of the mounting band 359 adjacent the opposite ends 357 are disposed between the sidewalls 346. As a result, the sidewalls 346 overlap a circumferential length L (FIG. 11) of edges 376 of the mounting band 359. The sidewalls 346 of the spring seat 356 may receive the edges 376 of the mounting band 359 in a clearance fit, press fit, or interference fit manner. The end walls 350 form interfaces with the outer surface 374 of the mounting band 359. Line welds LWS are formed along the interfaces between the outer surface 374 and the end walls 350 to secure the spring seat 356 to the mounting band 359. Once cooled, the line welds LWS create tension that maintains the intimate contact between the mounting band 359 and the axle 220. In addition, a pair of U-bolts (not shown) is disposed about the axle 220 and connect with a bottom block (not shown) located below the leaf spring stack 224 to form the primary connection between the leaf spring stack and the central tube 206, as is known.

Thus, the axle spring seat attachment assembly 352, according to the subject disclosure, eliminates the use of line welds on the axle 220, eliminating or minimizing the formation and/or effect of stress risers and allowing the use of the thin-wall axle 220, which desirably reduces the weight and amount of materials and cost of manufacturing of the axle/suspension system 200. The axle spring seat attachment assembly 352 unexpectedly provides an improved connection due to the constant compression on the continuous window weld CWW from the load of the heavy-duty vehicle, reducing or eliminating the reverse cycling fatigue and potential damage caused by the resultant vertical and fore-aft loads acting on the axle seat attachment assemblies.

A pair of axle spring seat attachment assemblies 452, according to yet another aspect of the subject disclosure, is illustrated attached to a thin-wall axle 220 in FIGS. 12-15. The axle spring seat attachment assemblies 452 are illustrated in a top mount, or overslung, configuration. However, it is contemplated that the axle spring seat attachment assemblies 452 may be utilized in any other types and/or configurations of axle/suspension systems, such as axle/suspension 200 described above.

The axle spring seat attachment assemblies 452 each have an upper or top bracket or spring seat 456 and a bottom spring seat 458 rigidly fixed to a mounting band 459 (FIG. 13) by any suitable means, such as welds. Each mounting band 459 is disposed at least partially about, and is in intimate contact with, the axle 220. The mounting band 459 extends around the central tube 206 at least 180 degrees, but less than 360 degrees. The mounting band 459 has an arcuate recess or inner surface 472 that is complementary to the periphery of the upper half of the central tube 206 of the axle 220. The inner surface 472 defines a dimension D1" which can range from significantly smaller than to generally the same size as an outer diameter of the smallest central tube 206 to which the mounting band 459 will be mounted, depending upon the method of mounting. The mounting band 459 is oriented such that opposite ends 457 of the mounting band are each located within a respective one of the front and rear quadrants Q4', Q2', respectively, of the axle 220. The mounting band 459 includes central tabs 496 projecting from the ends 457 and forming a respective pair of laterally extending shoulders 461.

In accordance with an important aspect of the subject disclosure, mounting band 459 includes a locator 492. The locator 492 may be a ring formed from the mounting band 459 using any suitable method, such as laser cutting. In particular, the locator 492 is formed before the mounting band 459 has been formed with an arcuate shape as described above. More particularly, a window 470 is formed in the mounting band with a continuous inner perimeter. An opening 494 is then at least partially formed in the mounting band 459 concentrically about the continuous inner perimeter of window 470, thereby forming the locator 492. Thus, the locator 492 is similarly-shaped, or concentric with, and disposed within the opening 494 in mounting band 459. Alternatively, the locator 492 may be formed after the inner surface 472 of the mounting band 459 has been provided with an arcuate shape. It is also contemplated that the locator 492 and mounting band 459 could be formed separately. The opening 494 is generally formed in the mounting band 459, such that the opening, and thus the locator 492 and the window 470, may be located away from the neutral axis plane N' (FIG. 5) of the axle 220 to maximize reduction of thickness of the axle. Specifically, the locator 492 and the window 470 may be located about the front or rear portion of the axle 220 an angle α above or below the neutral axis plane N'. In particular, the locator 492 and window 470 may be located and centered about the axle 220 a circumferential distance α that is anywhere from about forty-five degrees above or below the neutral axis plane N', within the front or the rear quadrant Q4', Q2', respectively, or within the top quadrant Q1. More preferably, the locator 492 and window 470 may be located about the rear portion of the axle 220 a circumferential distance α that is about forty-five degrees above the neutral axis plane N'.

The opening 494 has an inner dimension D3 that is greater than an outer dimension D2 of the locator 492. The minimum difference between the inner dimension D3 of the opening 494 and the outer dimension D2 of the locator 492 prior to providing the mounting band 459 with an arcuate shape may be in the range of from about 0.010 inches to about 0.060 inches, more preferably from about 0.010 inches to about 0.040 inches. Once the mounting band 459 is provided with an arcuate shape, the minimum difference between the inner dimension D3 of the opening 494 and the outer dimension D2 of the locator 492 may be relatively smaller near the inner surface 472 than at the outer surface 474. The window 470 has an inner dimension D4 that is less than the outer dimension D2 of the locator 492. The inner dimension D4 of the window 470 is generally maximized to reduce fatigue. It is also contemplated that the locator 492, opening 494, and window 470 may have any other suitable continuous shape.

The locator 492 may also include one or more tabs or tethers 495 that connect, and are continuous between, the locator and the mounting band 459. As a result, the locator 492 is at least partially attached to the mounting band 459 and retained within the opening 494. The tethers 495 may have any suitable size, shape, and arrangement between the locator 492 and the mounting band 459. The tethers 495 aid in manufacturing and installation of the mounting band 459 and locator 492, preventing separation or loss of the locator during forming prior to installation. The tethers 495 are generally non-load bearing structures, such that the tethers may break during installation of the mounting band 459 or operation of the heavy-duty vehicle, detaching the locator 492 from the mounting band. Alternatively, the tethers 495 may remain connected to the locator 492 and mounting band 459.

The mounting band 459 is disposed about or snapped onto the axle 220 by the application of an appropriate amount of transverse force using any suitable means, such as a mechanical or hydraulic press (not shown), or through an appropriate tool or adapter, such as a clamping system (not shown), such that the inner surface 472 of the mounting band is in contact with the axle. Specifically, the appropriate amount of force is applied transversely across the axle 220 by the hydraulic press to an outer surface 474 of the mounting band 459. The appropriate amount of force applied to the outer surface 474 of the mounting band 459 may elastically deform the mounting band in the area about which the mounting band is disposed.

The fitting of the inner surface 472 of the mounting band 459 onto the axle 220 goes beyond mere force-fitting. While force-fitting the inner surface 472 of the mounting band 459 onto the axle 220 generally creates uninterrupted contact, it also leaves intermittent areas of clearance at the interface between the outer surface of the upper portion of the axle and the inner surface of the mounting band. As a result, areas of clearance at critical regions between the axle 220 and the mounting band 459 may remain. However, the appropriate amount of force applied to the outer surface 474 provides intimate contact beyond force, press, or interference fit. The appropriate amount of force applied to the mounting band 459, bearing on axle 220, eliminates any clearance between the outer surface of the upper portion of the axle and the inner surface 472 of the mounting band. The intimate contact condition may exist without actual deformation of axle 220 if there is a lack of clearance between the axle and the mounting band 459, especially in critical regions between the axle and the mounting band, such as where a weldment may be formed. This intimate contact provides a constant relatively low preload or compression condition between the central tube 206 and the mounting band 459, which significantly restricts relative motion between the central tube and the mounting band. The intimate contact dissipates various stresses and improves the reverse cycling fatigue resistance, preventing potentially adverse effects on the integrity of the axle 220 or welds between the mounting band 459 and the central tube 206.

In accordance with another important aspect of the subject disclosure, the locator 492 acts as a mechanical locking mechanism between the axle 220 and mounting band 459. In particular, a continuous window weld CWW (FIG. 13) is formed between the inner perimeter of the window 470 of the locator 492 and the central tube 206 to rigidly attach the locator 492 to the axle 220. The continuous window weld CWW starts and stops at the same point within the window 470, such that the continuous window weld has no start or end points. As a result, stress risers from distinct start and end points may be reduced and/or eliminated, thereby eliminating the need for thicker or heavier prior art axles and allowing for the use of the thin-wall axle 220. Moreover, because the locator 492 is rigidly attached to the central tube 206 and disposed within opening 494 of the mounting band 459, the locator significantly restricts relative axial and circumferential movement between the mounting band and the axle 220.

In accordance with yet another important aspect of the subject disclosure, the locator 492 acts to isolate forces acting on the continuous window weld CWW from the mounting band 459. In particular, forces acting upon the axle 220 are transferred to the continuous window weld CWW. However, because the tethers 495 between the mounting band 459 and locator 492 are non-load bearing, the locator becomes separated from the mounting band when force is applied to the tethers. As a result, the mounting band 459 is relatively isolated from many of the forces on the continuous window weld CWW and the axle 220.

The top spring seat 456 has an inverted general U-shape that is at least partially complementary to the outer surface 474 of the mounting band 459. The top spring seat 456 includes a pair of sidewalls 446, a pair of end walls 450, and a spring wall 448. The sidewalls 446, the end walls 450, and the spring wall 448 are separately formed and joined into a subassembly by suitable means, such as welds. Alternatively, the sidewalls 446, the end walls 450, and the spring wall 448 may be integrally formed as a single piece by any suitable method, such as casting or forging. The spring wall 448 is substantially planar and generally rectangular in shape. The spring wall 448 has an opening 434 to accept a dowel or center bolt (not shown) that may extend through the leaf spring stack 224.

The sidewalls 446 extend longitudinally in parallel and are spaced a width W1" (FIG. 14) apart from each other. The sidewalls 446 also extend substantially orthogonally from the spring wall 448. Each of the sidewalls 446 may also include a forwardly- or rearwardly-extending bracket portion 437. The bracket portion 437 has a pair of transversely-aligned openings 439 for receiving a fastener (not shown) for connection to a radius rod (not shown). Each sidewall 446 has an inverted general U-shape, such that each sidewall complementarily receives the mounting band 459 in a press fit, or interference fit, manner. It is contemplated that the sidewalls 446 of the subject disclosure could also receive the mounting band 459 in a clearance fit manner.

The end walls 450 are disposed between and orthogonal to the sidewalls 446. The end walls 450 may extend inwardly from longitudinally-opposite ends of the spring wall 448 at angles toward the central tube 206, forming opposing slopes. Alternatively, the end walls 450 may extend orthogonally from longitudinally-opposite ends of the spring wall 448. The end walls 450 generally extend such that bottom ends 455 (FIG. 14) of the end walls are recessed from bottom ends 445 of the sidewalls 446. Alternatively, the end walls 450 may extend such that the bottom ends 455 of the end walls are coplanar with or extend beyond the bottom ends 445 of sidewalls 446.

Figure 13:
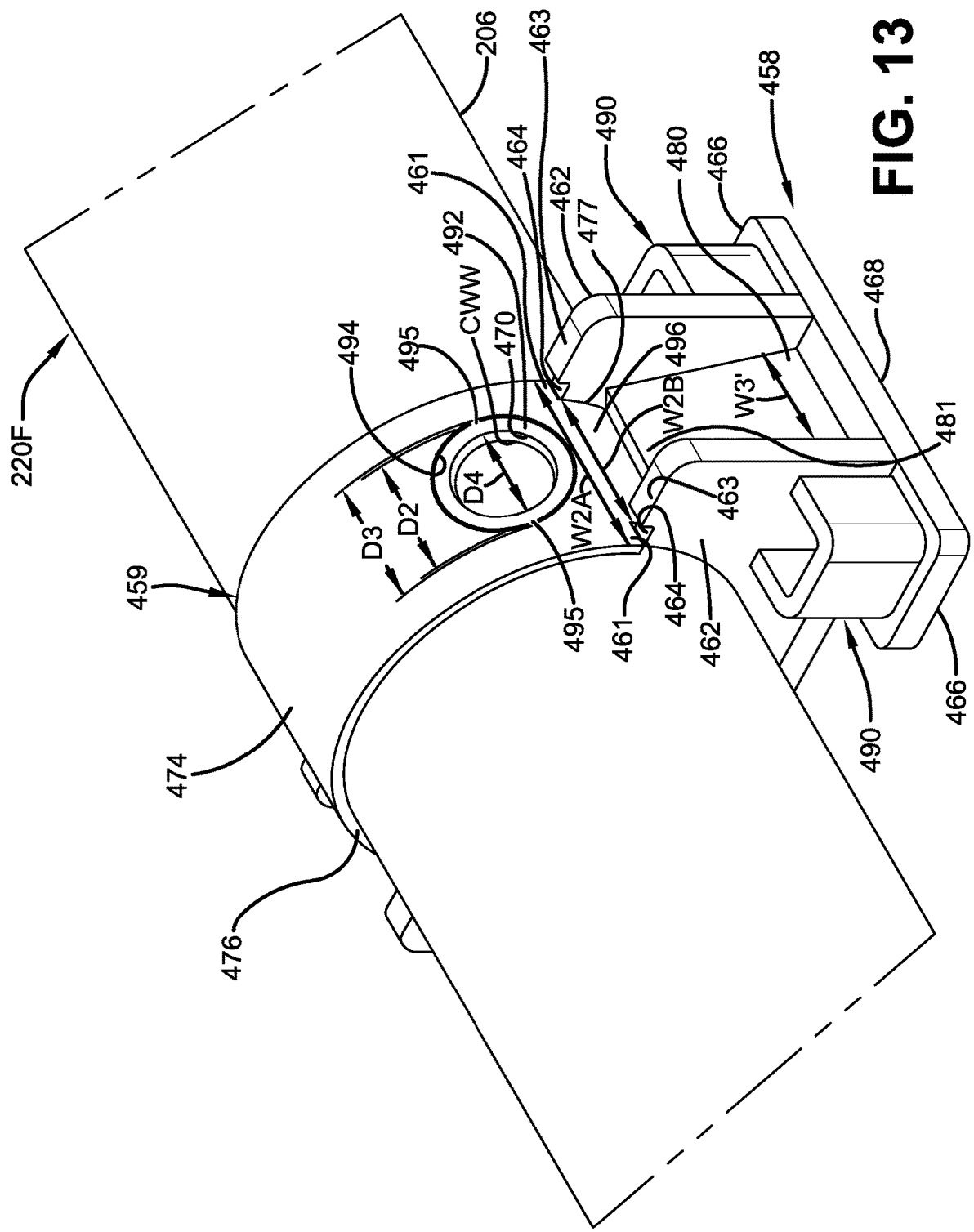
FIG. 13 is an enlarged fragmentary top perspective view, partially in phantom, of the axle spring seat attachment assembly illustrated in FIG. 12, showing the axle spring seat attachment assembly without the top spring seat.
Figure 14:
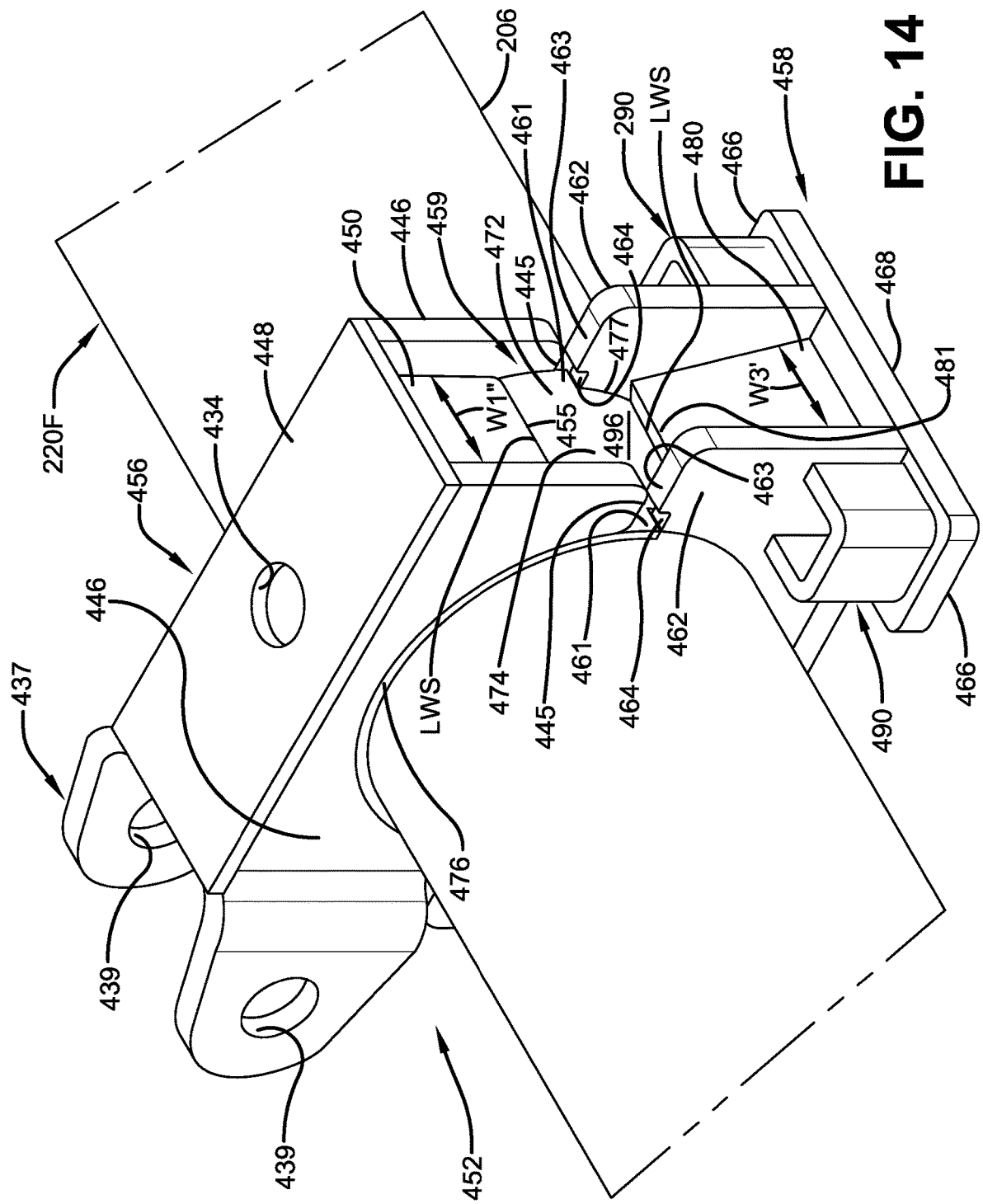
FIG. 14 is an enlarged fragmentary top perspective view of the axle spring seat attachment assembly shown in FIG. 12.
Figure 15:
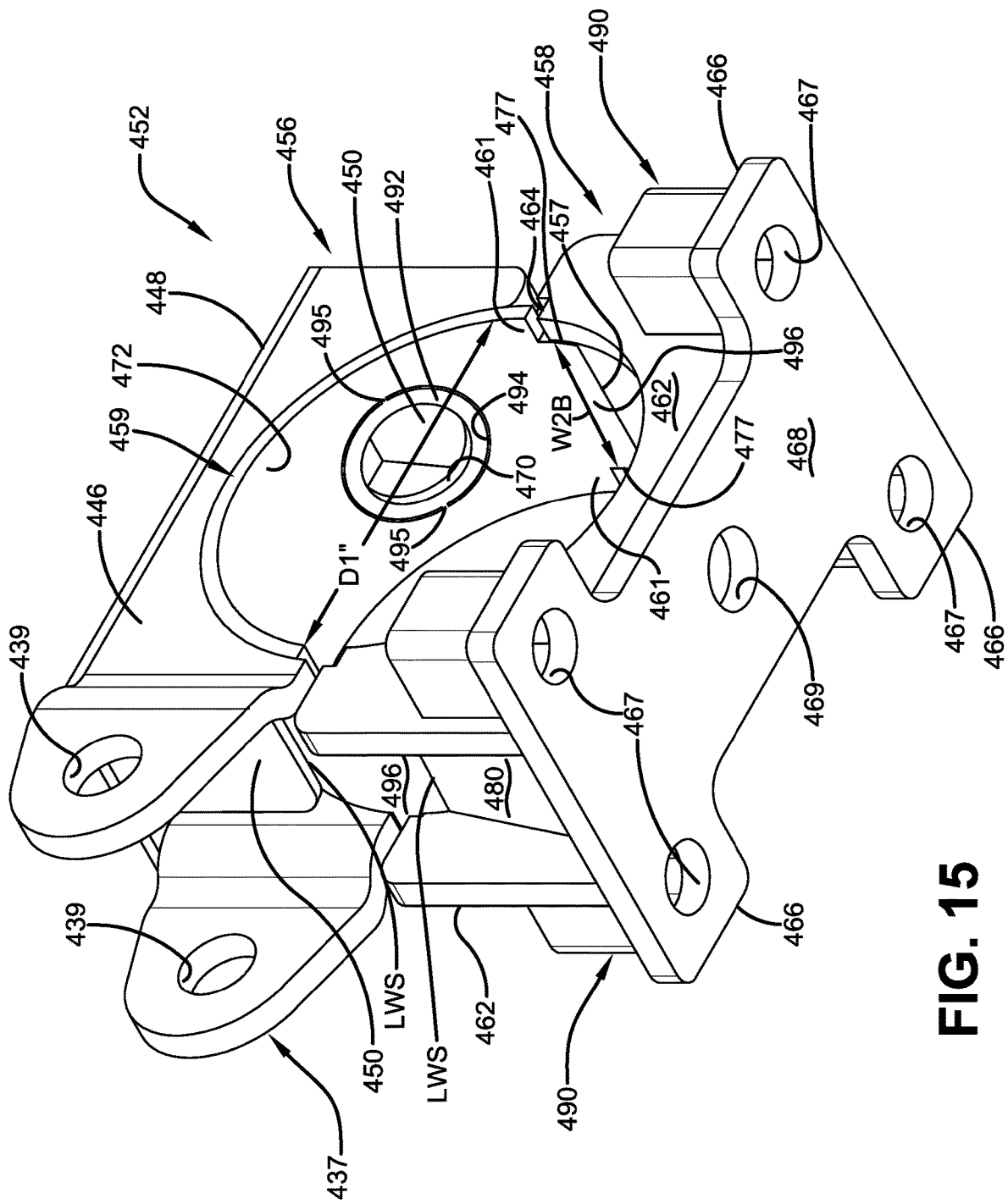
FIG. 15 is a bottom perspective view of the axle spring seat attachment assembly shown in FIGS. 12 and 14, with the axle removed.
Figure 16:
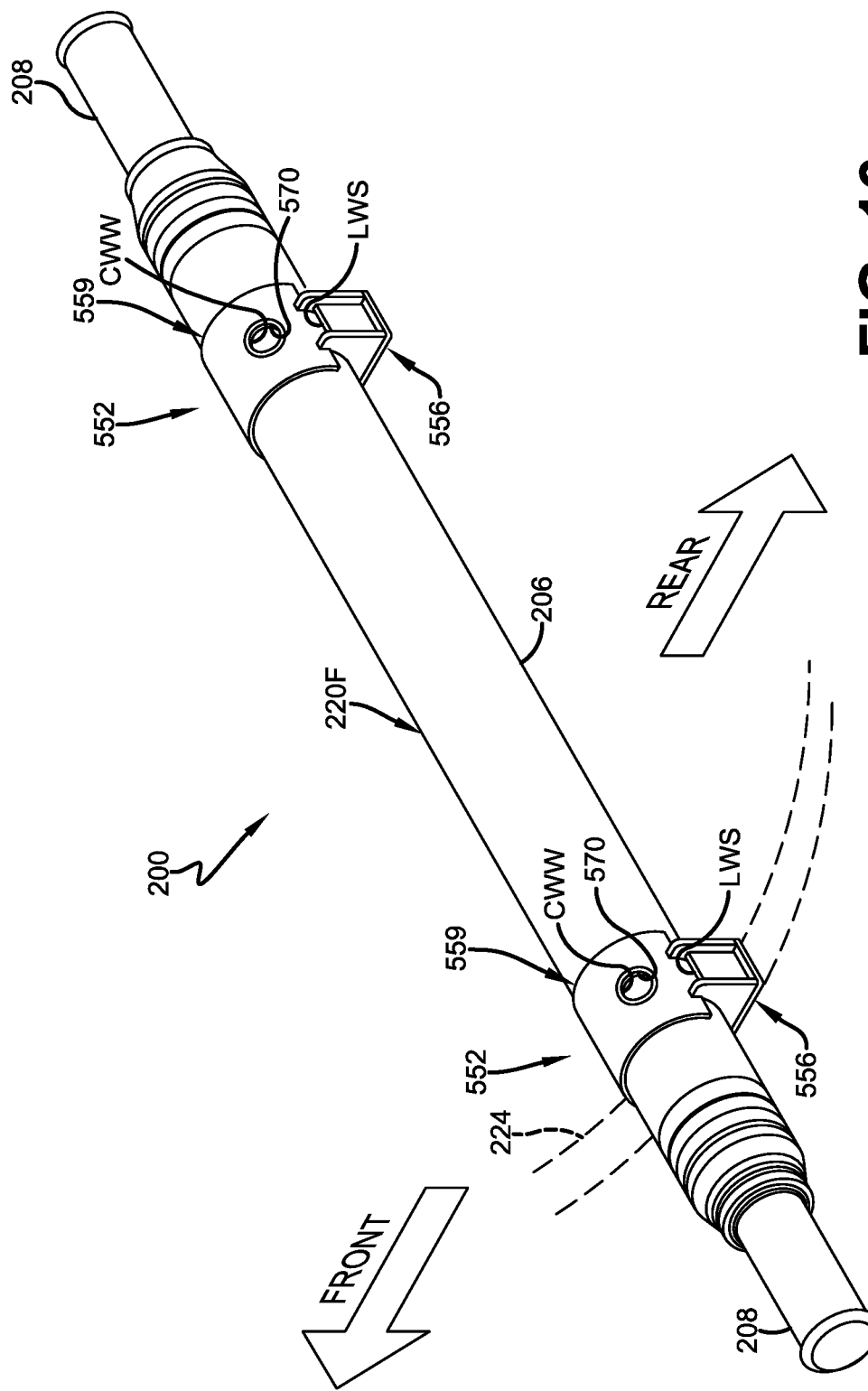
FIG. 16 is a fragmentary perspective view, partially in phantom, of a portion of a bottom mount or underslung mechanical spring axle/suspension system with a pair of axle spring seat attachment assemblies, according to still yet another aspect of the subject disclosure, mounted on an axle.
Figure 17:
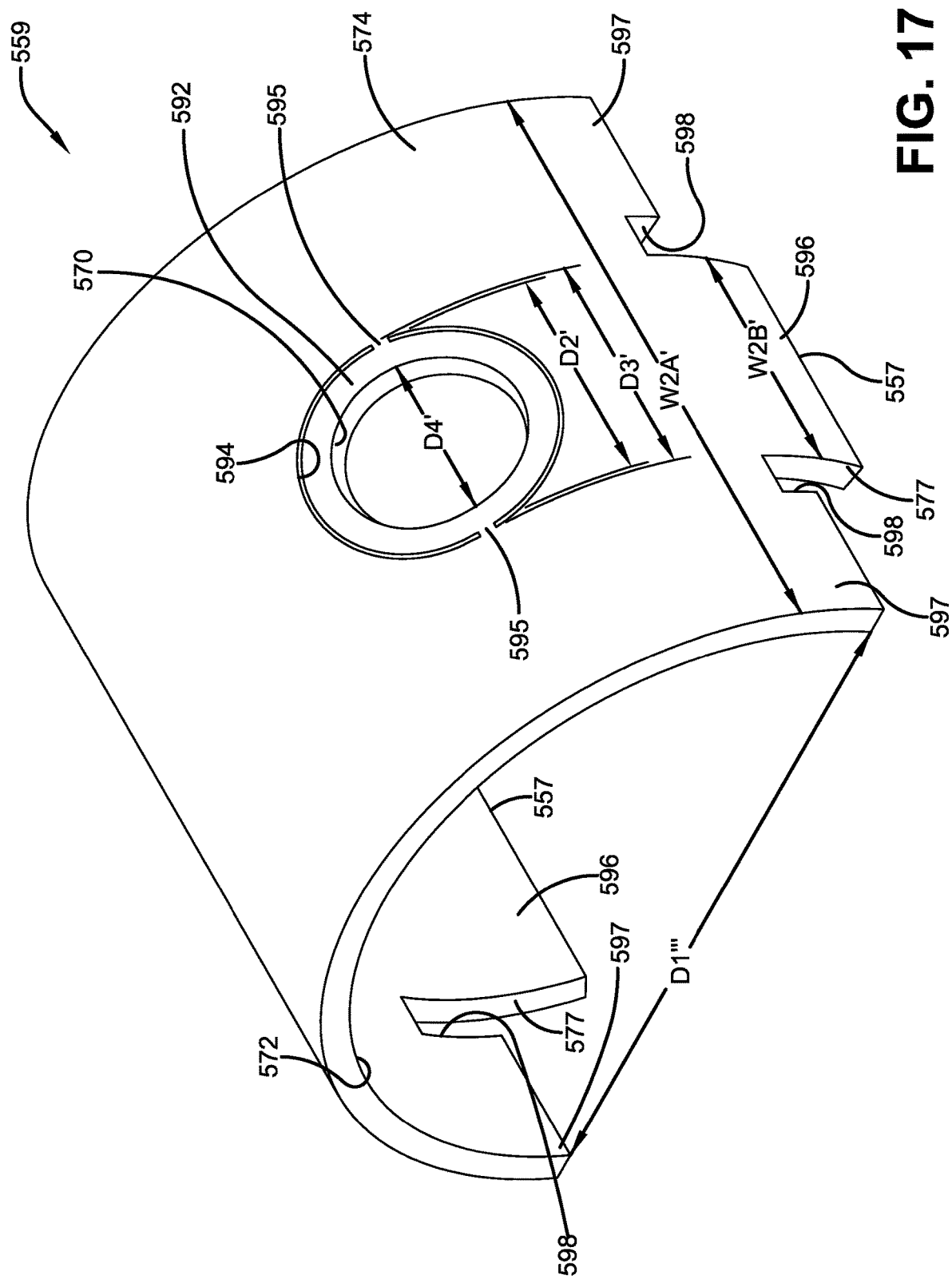
FIG. 17 is an enlarged perspective view of the mounting band of the axle spring seat attachment assembly illustrated in FIG. 16.

In accordance with an important aspect of the subject disclosure, the top spring seat 456 is indirectly attached to the axle 220. In particular, the top spring seat 456 is disposed over and fixed only to the mounting band 459 once the mounting band has been attached to the central tube 206. The mounting band 459 has a width W2A that is greater than a width W2B of the central tabs 496 (FIG. 13). The width W2B of the central tabs 496 is less than W1" of the top spring seat 456. The top spring seat 456 is disposed about the mounting band, such that the top spring seat is partially on or in contact with the mounting band. It is also contemplated that the top spring seat 456 may be disposed on the mounting band 459, such that edges 476 of the mounting band may be coplanar or continuous with the sidewalls 446. The end walls 450 form interfaces with the outer surface 474 of the mounting band 459. Line welds LWS are formed along the interfaces between the outer surface 474 of the mounting band 459 and the end walls 450 of the top spring seat 456 to secure the spring seat to the mounting band. The line welds may also be formed between the sidewalls 446 of the top spring seat 456 and the edges 476 of the mounting band 459.

The bottom spring seat 458 is similar in structure and arrangement to the top spring seat 456. Specifically, the bottom spring seat 458 has a general U-shape that is at least partially complementary to the bottom portion of the central tube 206 of the axle 220. The bottom spring seat 458 includes a bottom plate 468, a pair of sidewalls 462, and a pair of end walls 480. The sidewalls 462, the end walls 480, and the bottom plate 468 are formed separately and joined into a subassembly by any suitable means, such as welds. Alternatively, the sidewalls 462, the end walls 480, and the bottom plate 468 may be integrally formed as a single piece by any suitable method, such as casting or forging. The bottom plate 468 is substantially planar and generally rectangular. The bottom plate 468 includes one or more, but preferably four, integrally formed tabs 466 coplanar with the bottom plate. Each of the tabs 466 is adjacent to and extends outwardly from a respective corner of the bottom plate 468. The bottom plate 468 may be formed with an opening 469 for receiving a dowel or pin (not shown) extending through the leaf spring stack 224.

The sidewalls 462 extend in parallel and are spaced a width W3' (FIG. 13-14) apart from each other. The sidewalls 462 also extend orthogonally from the bottom plate 468 adjacent the tabs 466, such that the tabs extend perpendicularly away from the sidewalls 462 in opposite directions. Each sidewall 462 has a general U-shape, such that each sidewall complementarily receives the central tube 206 in a press fit, or interference fit, manner.

Each tab 466 of the bottom plate 468 is formed with a respective opening 467. Each of the openings 467 receives an end of one of a pair of U-bolts (not shown) to form the primary connection between the leaf spring stack 224 and the central tube 206, as is known. A series of guide walls 490 may be integrally formed with and extend orthogonally from the tabs 466. The guide walls 490 are adjacent and may abut or be connected to the side walls 462. The guide walls 490 at least partially surround the threaded and/or shank portions of the U-bolts. The U-bolts may engage the guide walls 490 during operation of the heavy-duty vehicle. The guide walls 490 provide structure over which lateral forces and fore-aft forces acting on the U-bolts may be distributed. As a result, the tabs 466 of the bottom plate 468 are less likely to be deformed by forces acting on the U-bolts.

The end walls 480 of bottom spring seat 458 may extend from longitudinally-opposite ends of the bottom plate 468 at angles toward the central tube 206, forming opposing slopes. Alternatively, end walls 480 may extend orthogonally from longitudinally-opposite ends of the bottom plate 468. Each end wall 480 is orthogonal to, and disposed between, the sidewalls 462. The end walls 480 generally extend such that top ends 481 of the end walls are recessed from top ends 463 of the sidewalls 462. Alternatively, the end walls 480 may extend such that the top ends 481 of the end walls are coplanar with or extend beyond the top ends 463 of sidewalls 462.

In accordance with another important aspect of the subject disclosure, the bottom spring seat 458 is indirectly attached to the axle 220. In particular, the bottom spring seat 458 is disposed over and fixed only to the mounting band 459. Specifically, the width W2$b$ of each of the central tabs 496 of the mounting band 459 is equal to or less than the width W3' extending between the sidewalls 462. The bottom spring seat 458 may be disposed about the central tube 206 of the axle 220, such that portions of the central tabs 496 adjacent each of the opposite ends 457 of mounting band 459 are disposed between the sidewalls 462. As a result, the sidewalls 462 overlap a circumferential length (not shown) of edges 477 of the central tabs 496 of the mounting band 259. Once the bottom spring seat 458 is placed about the mounting band 459, each of the shoulders 461 of the mounting band engage respective notches 464 formed in the top ends 463 of the sidewalls 462. Thus, the shoulders 461 allow proper positioning of the bottom spring seat 458 relative to the mounting band 459. The sidewalls 462 may receive the edges 477 of the central tabs 496 of the mounting band 459 in a clearance fit manner. Alternatively, the sidewalls 462 may receive the edges 477 in a press fit or interference fit manner. The end walls 480 of the bottom spring seat 458 form respective interfaces with the outer surface 474 of the mounting band 459. Line welds are formed along the interfaces between the outer surface 474 of the mounting band 459 and the end walls 480 of the bottom spring seat 458 to secure the bottom spring seat to the mounting band.

Thus, the axle spring seat attachment assembly 452, according to the subject disclosure, eliminates the use of line welds on the axle 220, eliminating or minimizing the formation and/or effect of stress risers and allowing the use of the thin-wall axle 220, which desirably reduces the weight and amount of materials and cost of manufacturing of the axle/suspension system 200. The axle spring seat attachment assembly 452 also includes the locator 492, which isolates the forces acting on the axle 220 from the mounting band 459, reducing or eliminating the reverse cycling fatigue damage caused by the resultant vertical and fore-aft loads acting on the axle seat attachment assemblies.

A pair of identical axle spring seat attachment assemblies 552, according to another aspect of the subject disclosure, is illustrated in FIGs. 16-19 attached to a thin-wall axle 220. The axle spring seat attachment assemblies 552 are illustrated in a bottom mount, or underslung, configuration. However, it is contemplated that the axle spring seat attachment assemblies 552 may be utilized in any other types and/or configurations of axle/suspension systems, such as axle/suspension 200 described above. Because the axle spring seat attachment assemblies 552 are identical, and for the sake of clarity conciseness, only one axle spring seat attachment assembly will be described below.

The axle spring seat attachment assembly 552 includes a spring seat 556 fixed to a mounting band 559 by suitable means, such as welds. The mounting band 559 is disposed at least partially about, and is in intimate contact with, the axle 220. The mounting band 559 extends around the central tube 206 at least 180 degrees, but less than 360 degrees. More particularly, the mounting band 559 has an arcuate recess or inner surface 572 (FIGS. 16 and 18) that is complementary to the periphery of the upper half of the central tube 206 of the axle 220. The inner surface 572 defines a dimension D1''' (FIG. 16), which can range from significantly smaller than to generally the same size as an outer diameter of the smallest central tube 206 to which the mounting band 559 will be mounted, depending upon the method of mounting. The mounting band 559 is disposed about the axle 220, such that opposite ends 557 of the mounting band are each located in a respective one of the front and rear quadrants Q4', Q2' (FIG. 5), respectively, of the axle. The mounting band 559 includes a pair of laterally-spaced notches 598 formed adjacent to each of the opposite ends 557. Each pair of notches 598 forms a respective central tab 596 between the notches and a pair of lateral tabs 597.

In accordance with an important aspect of the subject disclosure, mounting band 559 includes a locator 592. The locator 592 may be a circle or ring formed from the mounting band 559 using any suitable method, such as laser cutting. In particular, the locator 592 is formed from the mounting band 559 before the inner surface 572 of the mounting band has been provided with an arcuate shape as described above. More particularly, a window 570 is formed in the mounting band with a continuous inner perimeter. An opening 594 is then at least partially formed in the mounting band 559 concentrically about the window 570, thereby forming the locator 592. Thus, the locator 592 is similarly-shaped, or concentric with, and disposed within the opening 594 in mounting band 559. Alternatively, the locator 592 may be formed after the inner surface 572 of the mounting band 559 has been provided with an arcuate shape. It is also contemplated that the locator 592 and mounting band 559 could be formed separately. The opening 594 is generally formed in the mounting band 559, such that the opening, and thus the locator 592 and the window 570, may be located away from the horizontal or neutral axis plane N' to maximize reduction of thickness of the axle. Specifically, the locator 592 and the window 570 may be located about the front or rear portion of the axle 220 an angle α above or below the neutral axis plane N'. In particular, the locator 592 and window 570 may be located and centered about the axle 220 a circumferential distance α that is anywhere from about forty-five degrees above or below the neutral axis plane N', within the front or the rear quadrant Q4', Q2', respectively, or within the top quadrant Q1. More preferably, the locator 592 and window 570 may be located about the rear portion of the axle 220 a circumferential distance α that is about forty-five degrees above the neutral axis plane N'.

The opening 594 has an inner dimension D3' that is greater than an outer dimension D2' of the locator 592. The difference between the inner dimension D3' of the opening 594 and the outer dimension D2' of the locator 592 prior to providing the mounting band 559 with an arcuate shape may be in the range of from about 0.010 inches to about 0.060 inches, and more preferably from about 0.010 inches to about 0.040 inches. Once the mounting band 559 is provided with an arcuate shape, the minimum difference between the inner dimension D3' of the opening 594 and the outer dimension D2' of the locator 592 may be relatively smaller near the inner surface 572 than at the outer surface 574. The window 570 has an inner dimension D4' that is less than the outer dimension D2' of the locator 592. The inner dimension D4' of the window 470 is generally maximized to reduce fatigue. It is also contemplated that the locator 592, opening 594, and window 570 may have any other suitable continuous shape and/or size, such as that illustrated in FIG. 19.

The locator 592 may also include one or more tabs or tethers 595 that connect, and are continuous between, the locator and the mounting band 559. As a result, the locator 592 is at least partially attached to the mounting band 559 and retained within the opening 594. The tethers 595 may have any suitable size, shape, and arrangement between the locator 592 and the mounting band 559. The tethers 595 aid in manufacturing and installation of the mounting band 559 and locator 592, preventing separation or loss of the locator prior to installation. The tethers 595 are generally non-load bearing structures, such that the tethers may break during installation of the mounting band 559 or operation of the heavy-duty vehicle, detaching the locator 592 from the mounting band. Alternatively, the tethers 595 may remain connected to the locator 592 and mounting band 559.

The mounting band 559 is disposed about or snapped onto the axle 220 by the transverse application of an appropriate amount of force using any suitable means, such as a mechanical or hydraulic press (not shown), or through an appropriate tool or adapter, such as a clamping system (not shown), such that the inner surface 572 of the mounting band is in contact with the axle. Specifically, the appropriate amount of force is applied transversely across the axle 220 by the hydraulic press to an outer surface 574 of the mounting band 559. The appropriate amount of force applied to the outer surface 574 may elastically deform the mounting band 559 in the area about which the mounting band is disposed.

The fitting of the inner surface 572 of the mounting band 559 onto axle 220 goes beyond mere force-fitting. Force-fitting the inner surface 572 of the mounting band 559 onto the axle 220 would create generally uninterrupted contact, but would also leave intermittent areas of clearance at the interface between the outer surface of the upper portion of the axle and the inner surface of the mounting band. As a result, areas of clearance at critical regions between the axle 220 and the mounting band 559 may remain. However, the appropriate amount of force applied to the outer surface 574 provides intimate contact beyond force, press, or interference fit. Specifically, the appropriate amount of force applied to the mounting band 559, bearing on the axle 220, eliminates any significant clearance between the outer surface of the upper portion of the axle and the inner surface 572 of the mounting band. The intimate contact may exist without actual deformation of the axle 220 if there is a lack of clearance between the axle and the mounting band 559, especially in critical regions between the axle and the mounting band, such as where a weldment may be formed. This intimate contact provides a constant relatively low preload or compression condition between the axle central tube 206 and the mounting band 559, which significantly restricts relative motion between the central tube and the mounting band. The intimate contact dissipates various stresses and improves the reverse cycling fatigue resistance, preventing adverse effects on the integrity of the axle 220 or welds between the mounting band 559 and the axle.

In accordance with another important aspect of the subject disclosure, the locator 592 acts as a mechanical locking mechanism between the axle 220 and mounting band 559. In particular, a continuous window weld CWW (FIG. 16) is formed between the inner perimeter of the window 570 of the locator 592 and the central tube 206 to rigidly attach the locator 592 to the axle 220. The continuous window weld CWW starts and stops at the same point within the window 570, such that the continuous window weld has no start or end points. As a result, stress risers from distinct start and end points may be reduced and/or eliminated, thereby eliminating the need for thicker or heavier prior art axles and allowing for the use of the thin-wall axle 220. Moreover, because the locator 592 is rigidly attached to the central tube 206 and disposed within opening 594 of the mounting band 559, the locator significantly restricts relative axial and circumferential movement between the mounting band and the axle 220.

In accordance with yet another important aspect of the subject disclosure, the locator 592 acts to isolate forces acting on the continuous window weld CWW from the mounting band 559. In particular, forces acting upon the axle 220 are transferred to the continuous window weld CWW. However, because the tethers 595 between the mounting band 559 and locator 592 are non-load bearing, the locator becomes separated from the mounting band when force is applied to the tethers. As a result, the mounting band 559 is isolated from the forces on the axle 220 and the continuous window weld CWW.

Figure 18:
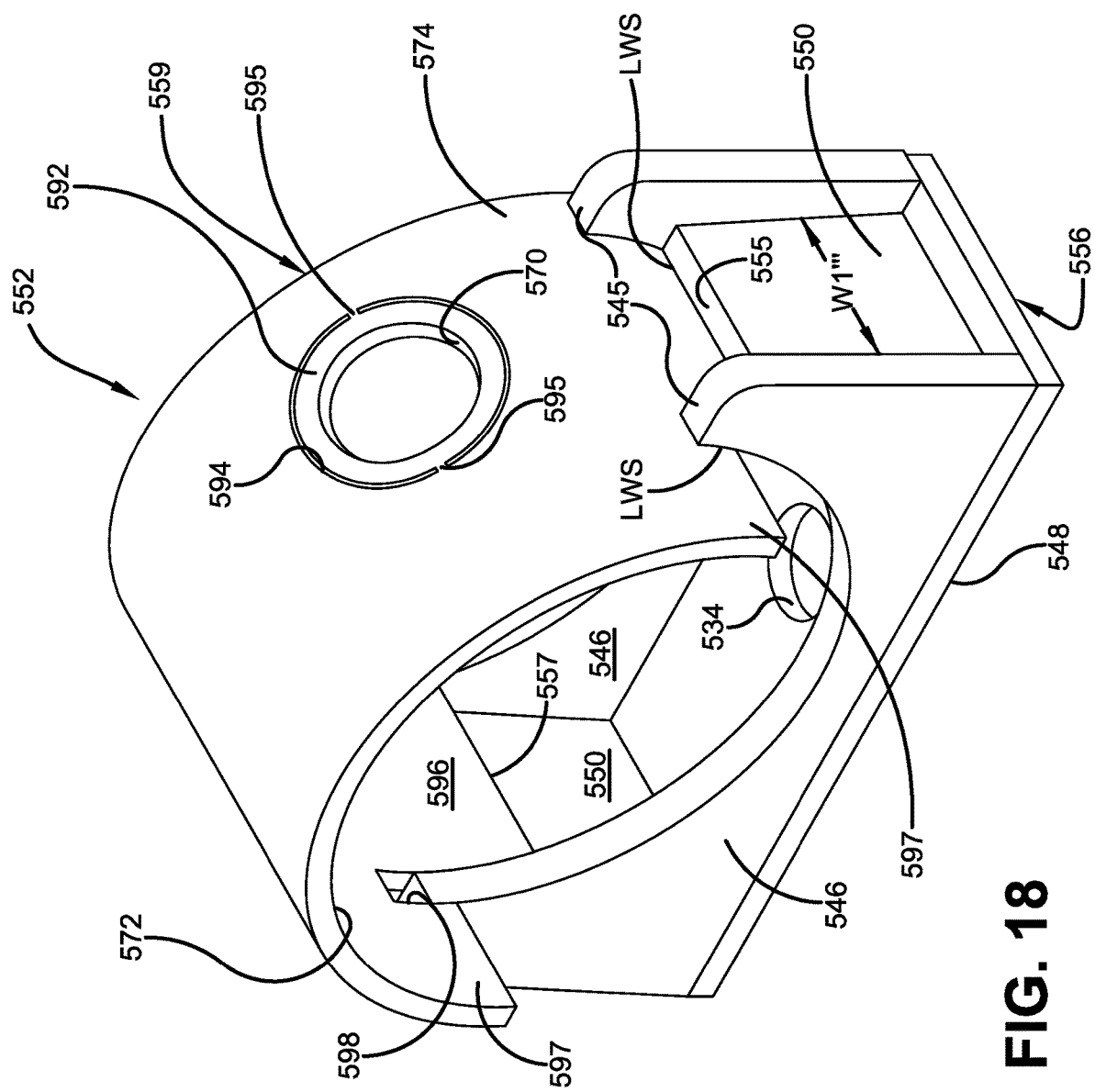
FIG. 18 is an enlarged perspective view of the axle spring seat attachment assembly illustrated in FIG. 16, with the axle removed.
Figure 19:
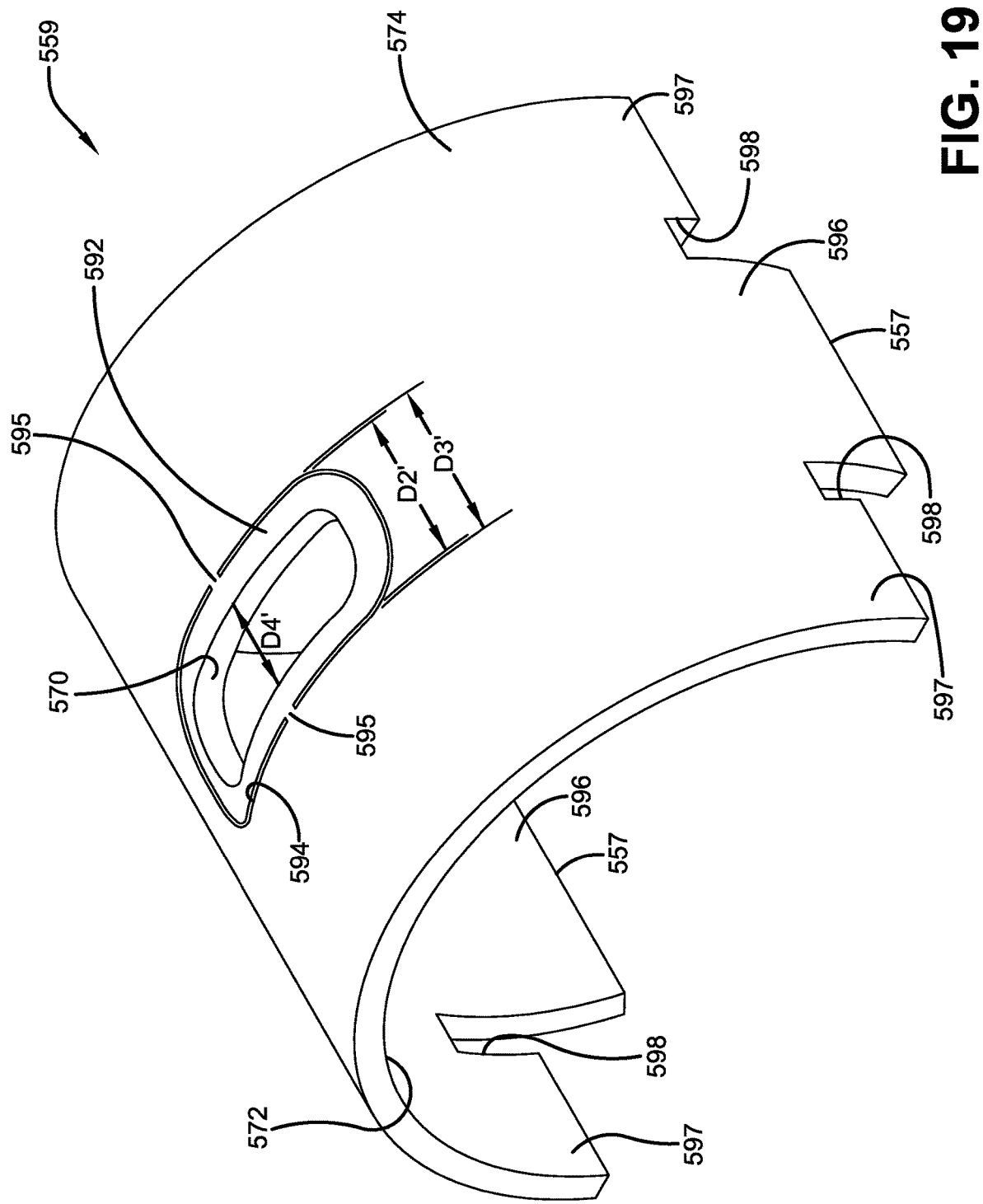
FIG. 19 is an enlarged perspective view of the mounting band of the axle spring seat attachment assembly illustrated in FIG. 17, showing the locator, opening, and window with an alternate continuous shape.

With particular reference to FIG. 18, the spring seat 556 has a general U-shape to surround a portion of the axle 220. The spring seat 556 includes a pair of sidewalls 546, a pair of inclined end walls 550, and a spring wall 548. The sidewalls 546, the end walls 550, and the spring wall 548 are separately formed and joined into a subassembly using suitable methods, such as welding. Alternatively, the sidewalls 546, the end walls 550, and the spring wall 548 may be integrally formed as a single piece by any suitable method, such as casting or forging. The spring wall 548 is substantially planar and generally rectangular in shape. The spring wall 548 is formed with an opening 534 to accept a dowel, pin, or center bolt (not shown) that may extend through the leaf spring stack 224. The sidewalls 546 extend in parallel and are spaced a width W1''' apart from each other. The sidewalls 546 also extend substantially orthogonally from the spring wall 548. Each sidewall 546 has a general U-shape, such that each sidewall complementarily receives the central tube 206 in a press fit, or interference fit, manner.

The end walls 550 are disposed between, and orthogonal to, the sidewalls 546. The end walls 550 extend from longitudinally-opposite ends of the spring wall 548 at angles toward the central tube 206, forming opposing slopes. Alternatively, the end walls 550 may extend orthogonally from longitudinally-opposite ends of the spring wall 548. The end walls 550 generally extend, such that top ends 555 (only one shown) of the end walls are recessed from top ends 545 of the sidewalls 546. Alternatively, the end walls 550 may extend, such that the top ends 555 of the end walls are coplanar with or extend beyond the top ends 545 of the sidewalls 546.

In accordance with another important aspect of the subject disclosure, the spring seat 556 is indirectly attached to the axle 220. In particular, the spring seat 556 is disposed over and fixed only to the mounting band 559 after the mounting band is attached to the central tube 206. The mounting band 559 has a width W2A' that is greater than a width W2B' of the central tabs 596. The ratio of the width W2A' of the mounting band 559 to a width (not shown) of the spring stack 224 is in the range of about 1.70 to about 1.90. More preferably, the ratio of the width W2A' of the mounting band 559 to the width of the spring stack 224 is about 1.86. The width W2B' of the central tabs 596 is less than W1''' of the spring seat 556. Once the mounting band 559 is disposed about the axle 220, the spring seat 556 may be disposed about the axle, such that portions of the central tabs 596 are disposed between the sidewalls 546 of the spring seat. Portions of the mounting band 559, including the lateral tabs 597 are disposed laterally adjacent to the sidewalls 546. As a result, the sidewalls 546 overlap edges 577 of the central tabs 596 of the mounting band 559. The sidewalls 546 may receive the edges 577 of the central tabs 596 in a clearance fit, press fit, or interference fit manner. The end walls 550 of the spring seat 556 interface with the outer surface 574 of the mounting band 559. Line welds LWS (FIGS. 16 and 18) are formed along the interfaces between the outer surface 574 of the mounting band 559 and the end walls 550 of the spring seat 556 to secure the spring seat to the mounting band. Once cooled, the line welds LWS create tension that maintains the intimate contact between the mounting band 559 and the axle 220. The line welds LWS may also be formed between the sidewalls 546 of the spring seat 556 and the outer surface 574 of the lateral tabs 597 of the mounting band 559. In addition, a pair of U-bolts (not shown) or other suitable fasteners are disposed about the mounting band 559 over the lateral tabs 597 and connect with a bottom block (not shown) to form the primary connection between the leaf spring stack 224 and the axle 220.

Thus, the axle spring seat attachment assembly 552, according to the subject disclosure, eliminates the use of line welds on the axle 220, eliminating or minimizing the formation and/or effect of stress risers and allowing the use of the thin-wall axle 220, which desirably reduces the weight and amount of materials and cost of manufacturing of the axle/suspension system 200. The axle spring seat attachment assembly 552 also includes the locator 592, which isolates the forces acting on the axle 220 from the mounting band 559, reducing or eliminating the reverse cycling fatigue potential damage caused by the resultant vertical and fore-aft loads acting on the axle seat attachment assemblies.

It is contemplated that the axle spring seat attachment assemblies 252, 352, 452, 552, according to the subject disclosure, may be utilized on any axle having any shape or thickness without affecting the overall concept or operation. It is also contemplated that the axle spring seat attachment assemblies 252, 352, 452, 552, according to the subject disclosure, may be employed in conjunction with any type of heavy-duty vehicle axle/suspension system without affecting the overall concept or operation. It is further contemplated that the axle spring seat attachment assemblies 252, 352, 452, 552, according to the subject disclosure, may employ other materials, shapes, sizes, structures, and the like, without affecting the overall concept or operation. It is still further contemplated that the axle spring seat attachment assemblies 252, 352, 452, 552, according to the subject disclosure, may be employed to mount any vehicle components, including braking system components, on an axle/suspension system without affecting the overall concept or operation.

Accordingly, the new and improved axle spring seat attachment assembly is simplified; provides an effective, safe, inexpensive, and efficient structure that eliminates difficulties encountered with prior art spring seat assemblies; and solves problems and obtains new results.

In the foregoing description, certain terms have been used for brevity, clarity, and understanding, but no unnecessary limitations are to be implied beyond the requirements of the prior art, because such terms are used for descriptive purposes and intended to be broadly construed.

The subject disclosure has been described with reference to specific aspects. It is to be understood that this description and illustration are by way of example and not by way of limitation. Potential modifications and alterations will occur to others upon a reading and understanding of the subject disclosure, and it is understood that the invention includes all such modifications, alterations, and equivalents.

Having now described the features, discoveries and principles of the invention, the manner in which the axle spring seat attachment assembly is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A spring seat attachment assembly for use with an axle/suspension system having at least one leaf spring and an axle, the spring seat attachment assembly comprising:
    a mounting band extending around a portion of the axle between about 180 degrees and about 360 degrees, said mounting band having an opening with a continuous edge, the mounting band being fixed to said axle only at a location away from a neutral axis of the axle by a continuous weld formed about the continuous edge; and
    a spring seat for receiving said at least one leaf spring, said spring seat being fixed to the mounting band.

2. The spring seat attachment assembly of claim 1, said mounting band being fixed to a top portion of said axle by said continuous weld formed about the continuous edge.

3. The spring seat attachment assembly of claim 1, said mounting band further comprising an arcuate inner surface extending between a pair of edges, said arcuate surface having a shape generally complementary to said portion of said axle.

4. The spring seat attachment assembly of claim 3, said inner surface defining a dimension that is smaller than or equal to a dimension of said portion of said axle prior to mounting said mounting band on the axle;
    wherein, upon mounting the mounting band on said axle, at least a portion of an interface between the portion of the axle and said mounting band is free of clearance.

5. The spring seat attachment assembly of claim 4, said interface between said portion of said axle and said mounting band being in continuous compressive contact.

6. The spring seat attachment assembly of claim 1, said spring seat further comprising a parallel pair of side walls spaced a distance apart, said distance having a first width,
    wherein said mounting band has a second width less than the first width and is at least partially disposed between the pair of sidewalls.

7. The spring seat attachment assembly of claim 6, said pair of side walls forming at least one interface with said mounting band and being fixed to the mounting band by at least one weld formed along said at least one interface.

8. The spring seat attachment assembly of claim 6, said spring seat further comprising a pair of inclined walls disposed between and orthogonal to said pair of sidewalls.

9. The spring seat attachment assembly of claim 8, said pair of inclined walls forming at least one interface with said mounting band and being fixed to the mounting band by at least one weld formed along said at least one interface.

10. A spring seat attachment assembly for use with an axle/suspension system having at least one leaf spring and an axle, the spring seat attachment assembly comprising:
    a mounting band having an opening, said mounting band extending around a portion of said axle for at least about 180 degrees but less than 360 degrees;
    a locating structure at least partially separated from the mounting band and disposed within said opening, said locating structure having a continuous edge, the locating structure being fixed to the axle only at a location away from a neutral axis of said axle by a continuous weld formed about said continuous edge; and
    a spring seat for receiving said at least one leaf spring, said spring seat being fixed to the mounting band.

11. The spring seat attachment assembly of claim 10, said locating structure further comprising a window defined by said continuous edge, the locating structure significantly restricting relative movement between said mounting band and said axle and isolating the mounting band from forces acting on the axle.

12. The spring seat attachment assembly of claim 11, said opening and said locating structure being disposed about said axle away from a neutral axis of the axle.

13. The spring seat attachment assembly of claim 12, said locating structure being disposed about said axle at about 45° above or below the neutral axis.

14. The spring seat attachment assembly of claim 10, said mounting band further comprising an arcuate inner surface extending between a pair of edges, said arcuate surface having a shape generally complementary to said axle.

15. The spring seat attachment assembly of claim 14, said inner surface defining a dimension that is smaller than or equal to a dimension of said axle prior to mounting said mounting band on the axle;
    wherein upon mounting the mounting band on said axle, at least a portion of an interface between the axle and said mounting band is free of clearance.

16. The spring seat attachment assembly of claim 15, said interface between said axle and said mounting band being in continuous compressive contact.

17. The spring seat attachment assembly of claim 10, said spring seat further comprising a parallel pair of side walls spaced a distance apart, said distance having a first width;
    wherein said mounting band has at least one portion with a second width less than the first width, the at least one portion of the mounting band being at least partially disposed between said pair of sidewalls.

18. The spring seat attachment assembly of claim 17, said spring seat further comprising a pair of inclined walls disposed between and orthogonal to said pair of sidewalls.

19. The spring seat attachment assembly of claim 18, said pair of inclined walls forming at least one interface with said mounting band and being fixed to the mounting band by at least one weld formed along said at least one interface.

20. A method of assembling a spring seat attachment assembly for use with an axle/suspension system comprising:
    a. providing a mounting band;
    b. forming at least one window with a continuous perimeter in the mounting band corresponding to a location away from a neutral axis of said axle;
    c. at least partially forming an opening in said mounting band, wherein said opening is concentric with said at least one window;
    d. forming the mounting band into an arcuate shape complementary to a portion of an axle;
    e. mounting the mounting band on a top portion of the axle, wherein an inner surface of said mounting band and an outer surface of said axle form an interface free of clearance;
    f. forming at least one continuous weld between said continuous perimeter of the at least one window and the axle to attach the mounting band to said axle only at a location away from said neutral axis of said axle;
    g. disposing at least one spring seat about the mounting band; and
    h. fixing said at least one spring seat to said mounting band.

* * * * *